United States Patent
Gao

(10) Patent No.: US 9,141,842 B2
(45) Date of Patent: Sep. 22, 2015

(54) TIME DIVISION EXPOSURE OF A DATA READER

(71) Applicant: Datalogic ADC, Inc., Eugene, OR (US)

(72) Inventor: WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 64 days.

(21) Appl. No.: 13/767,652

(22) Filed: Feb. 14, 2013

(65) Prior Publication Data

US 2013/0206839 A1    Aug. 15, 2013

Related U.S. Application Data

(60) Provisional application No. 61/599,323, filed on Feb. 15, 2012.

(51) Int. Cl.
*G06K 7/10* (2006.01)

(52) U.S. Cl.
CPC .......... *G06K 7/1096* (2013.01); *G06K 7/10851* (2013.01); *G06K 7/10861* (2013.01)

(58) Field of Classification Search
CPC . G06K 7/10732; G06K 7/10762; G06K 9/32; G06K 7/10851; G06K 7/10861; G06K 7/1096; H04N 13/0207; H04N 13/0253; H04N 13/0203; H04N 13/0271; H04N 5/2354; H04N 5/2357; G01B 11/24
USPC .............. 235/472.01–472.03, 462.01–462.45
See application file for complete search history.

(56) References Cited

U.S. PATENT DOCUMENTS

| | | | |
|---|---|---|---|
| 5,756,981 A | 5/1998 | Roustaei et al. | |
| 6,136,543 A * | 10/2000 | Anazawa et al. | 435/6.12 |
| 6,189,784 B1 | 2/2001 | Williams et al. | |
| 6,242,193 B1 * | 6/2001 | Anazawa et al. | 435/6.12 |
| 6,899,272 B2 | 5/2005 | Krichever et al. | |
| 7,398,927 B2 | 7/2008 | Olmstead et al. | |
| 7,823,787 B2 * | 11/2010 | He et al. | 235/462.42 |
| 8,488,210 B2 | 7/2013 | Smith | |
| 8,590,792 B2 * | 11/2013 | Tan et al. | 235/455 |
| 2003/0110610 A1 * | 6/2003 | Duquette et al. | 29/407.09 |
| 2004/0133112 A1 * | 7/2004 | Rajadhyaksha | 600/476 |

(Continued)

FOREIGN PATENT DOCUMENTS

| | | |
|---|---|---|
| JP | 06-052341 A | 2/1994 |
| JP | 11-203396 A | 7/1999 |

OTHER PUBLICATIONS

International Searching Authority, "International Search Report and Written Opinion," PCT/US2013/026463, May 29, 2013.

*Primary Examiner* — Thien M Le
(74) *Attorney, Agent, or Firm* — Stoel Rives LLP

(57) ABSTRACT

Disclosed systems and methods generate a sequence of images using a data reader having an imager exposed to multiple fields of view that are alternately illuminated to coincide with exposure periods forming an image capture rate. In one configuration, a first illumination source illuminates a first field of view of the data reader with a first series of illumination pulses at a first pulse repetition rate. The imager captures in an alternating manner a first set of images of the first field of view and a second set of images of a second field of view. The first pulse repetition rate and the image capture rate are set such that the imager captures the first set of images at approximately the same time as the first illumination source illuminates the first field of view with an illumination pulse.

25 Claims, 9 Drawing Sheets

(56) References Cited

U.S. PATENT DOCUMENTS

| | | | |
|---|---|---|---|
| 2008/0130093 A1* | 6/2008 | Silberberg et al. | 359/298 |
| 2008/0265035 A1 | 10/2008 | Vinogradov et al. | |
| 2009/0118622 A1* | 5/2009 | Durkin et al. | 600/473 |
| 2009/0206161 A1 | 8/2009 | Olmstead | |
| 2010/0102129 A1 | 4/2010 | Drzymala et al. | |
| 2010/0163622 A1 | 7/2010 | Olmstead | |
| 2010/0213259 A1 | 8/2010 | Gao | |
| 2010/0270376 A1 | 10/2010 | McQueen | |
| 2012/0257082 A1* | 10/2012 | Kato et al. | 348/229.1 |
| 2012/0287332 A1* | 11/2012 | Fjellstad et al. | 348/362 |
| 2013/0206839 A1* | 8/2013 | Gao | 235/462.42 |

* cited by examiner

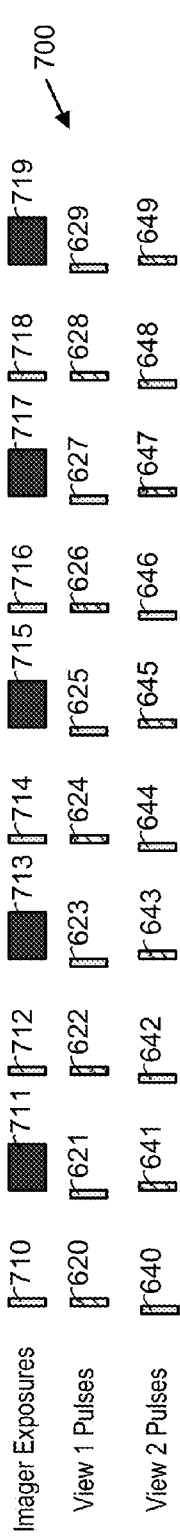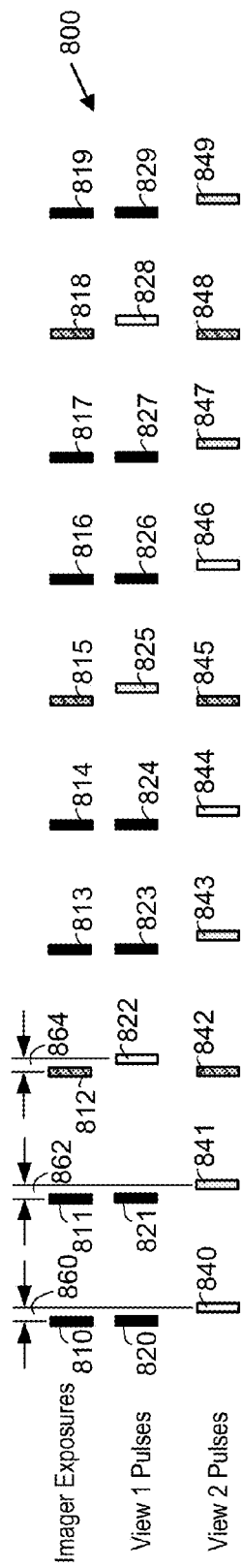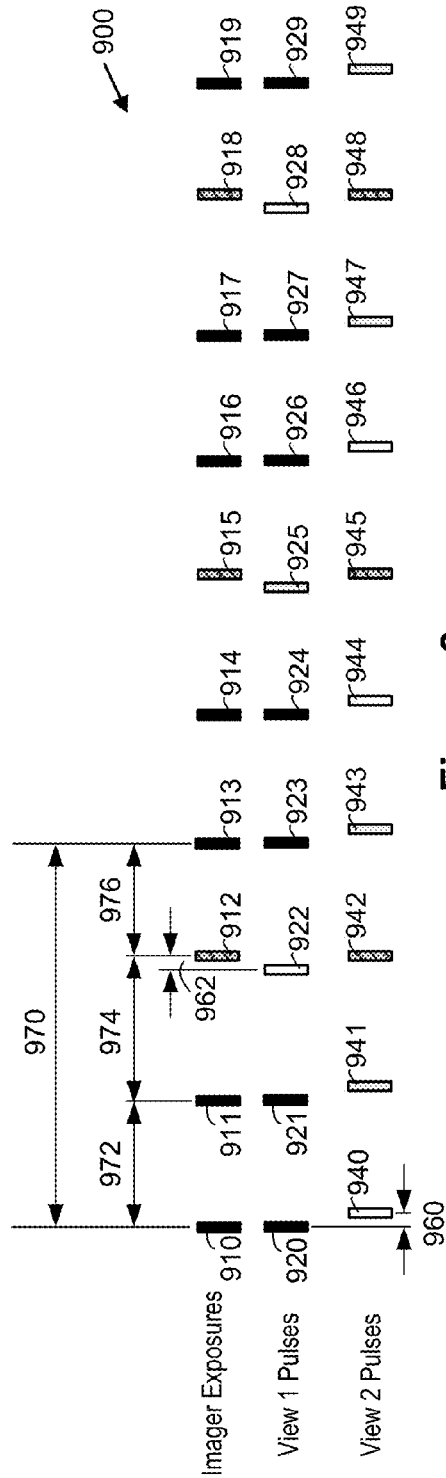
Figure 7
Figure 8
Figure 9

TIME DIVISION EXPOSURE OF A DATA READER

RELATED APPLICATIONS

This application claims priority benefit under 35 U.S.C. §119(e) of U.S. Provisional Patent Application No. 61/599,323, filed Feb. 15, 2012, which is incorporated herein by reference in its entirety.

BACKGROUND INFORMATION

The field of the present disclosure relates generally to data readers and, in particular, to systems and methods for generating image data from multiple views of a data reader.

Optical codes have widespread applications. For example, optical codes can be used to identify a class of objects (e.g., merchandise) or unique items (e.g., patents). As a result, optical codes are found on a wide variety of objects, such as retail goods, company assets, and documents, and help track production at manufacturing facilities and inventory at stores (by scanning items as they arrive and as they are sold). In addition, optical codes may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause an optical code to be displayed on their portable electronic device so that an employee (e.g., merchant-employee) can read the optical code via a data reader to allow the customer to redeem a coupon or to verify that the customer has purchased a ticket for the event.

An optical code, such as a barcode, is essentially a machine-readable representation of information in a visual format. Some optical codes use a dark ink on a white substrate to create high and low reflectance upon scanning. Based on the symbology being used (e.g., UPC, Code 39, Code 128, and PDF417), an optical code may comprise data characters (or codewords in the case of, e.g., PDF417) and/or overhead characters represented by a particular sequence of bars and spaces (which may have varying widths).

Optical code readers or data readers are used to capture optical codes or other symbols or information appearing on various surfaces in order to read the information encoded in the optical code or symbol. One commonly used data reader is an imager-based reader. Imager-based readers typically include solid state image circuitry, such as charge coupled devices (CCDs) or complementary metal-oxide semiconductor (CMOS) devices, and may be implemented using a one-dimensional or two-dimensional imaging array of photosensors (or pixels) to capture an image of the optical code. One-dimensional CCD readers capture a linear cross-section of the optical code, producing an analog waveform whose amplitude represents the relative darkness and lightness of the optical code. Two-dimensional CCD or CMOS readers may capture an entire two-dimensional image. The image is then processed to find and decode an optical code. For example, virtual scan line techniques are known techniques for digitally processing an image containing an optical code by looking across an image along a plurality of lines, typically spaced apart and at various angles, somewhat like a scan pattern of a laser beam in a laser-based scanner.

Imager-based readers typically form images from one perspective, usually that of a normal vector directed from the face of the imager. Such imager-based readers therefore provide only a single point of view. It may be desirable in certain applications to take images from multiple perspectives. A few imager-based readers that generate multiple perspectives are known. One such reader is disclosed in U.S. Pat. No. 6,899,272, which discloses one embodiment that utilizes two independent cameras pointed in different orthogonal directions to collect image data from different sides of a package. Imager-based readers that employ multiple cameras require multiple circuit boards, mounting hardware, and space for the associated optical components, which can increase the expense of the reader, complicate the physical design, and increase the size of the reader. Another embodiment according to the '272 patent utilizes a single camera pointed at a moveable mirror that moves between two positions (i.e., positions A and B) to select one of two different imaging directions. The single camera has even fields (i.e., lines 2, 4, 6, etc.) and odd fields (i.e., lines 1, 3, 5, etc.). When the mirror is in position A, the even field of the imager is exposed and when the mirror is in the position B, the odd field of the imager is exposed. With a sufficiently responsive imager, e.g., at least 60 frames per second (fps), and a synchronized moveable mirror, one frame of the scanner may be captured that includes two views of different sides of a package. Accurate synchronization of the moveable mirror with the imager exposure typically involves expensive mechanical parts and control systems capable of moving the mirror within a period of approximately several milliseconds (ms). Moreover, the use of the moveable mirror adds additional cost and may reduce the reliability of the reader.

SUMMARY OF THE DISCLOSURE

A method for generating image data using a data reader having an imager with multiple fields of view includes directing a first field of view of the imager along a first path; directing a second field of view of the imager along a second path; illuminating, via a first illumination source, the first field of view of the data reader with a first series of illumination pulses at a first pulse repetition rate; and capturing at the imager a sequence of images at an image capture rate and in an alternating manner with a first set of images of the first field of view and a second set of images of the second field of view and wherein the first pulse repetition rate and the image capture rate are set such that the imager captures the first set of images during the first illumination source illuminating the first field of view with an illumination pulse.

A data reader has a first illumination source configured to illuminate a first field of view of the data reader with a first series of illumination pulses at a first pulse repetition rate; an imager including a set of pixel imaging elements arranged in a two-dimensional imaging plane; a lens in optical association with the imager and configured to focus one or more fields of view onto substantially all of the pixel imaging elements of the imager; a beam splitter in optical association with the lens and the imager, wherein the beam splitter is configured to (1) direct light from the first field of view of the data reader along a first path to the lens and the imager and (2) direct light from a second field of view of the data reader along a second path to the lens and the imager; and a controller configured to be in operative association with the first illumination source and the imager, the controller configured to cause the imager to capture a sequence of images at an image capture rate, wherein the imager captures in an alternating manner a first set of images of the first field of view and a second set of images of the second field of view and wherein the first pulse repetition rate and the image capture rate are set such that the imager captures the first set of images at approximately the same time as the first illumination source illuminates the first field of view with an illumination pulse.

Also disclosed are embodiments of methods for sequentially obtaining first and second image data from a two-dimensional imaging plane of an imager in a data reader, in which the first image data corresponds to a first inspection region within a first field of view of the data reader and the second image data corresponds to a second inspection region within a second field of view of the data reader. In one embodiment, the method includes producing a first series of timing pulses timed according to an illumination-control rate and a second series of timing pulses timed according to an image-capture rate; receiving light from the first and second fields of view to produce combined light incident on the two-dimensional imaging plane; changing intensity of light received from the first field of view based on pulses in the first series of timing pulses; in response to a first image capture pulse in the second series of timing pulses, generating the first image data by a first exposure of the two-dimensional imaging plane to the combined light while the intensity of light received from the first field of view is at a first intensity level; and in response to a second image capture pulse in the second series of timing pulses, generating the second image data by a second exposure of the two-dimensional imaging plane to the combined light while the intensity of light received from the first field of view is at a second intensity level that is different from the first intensity level.

An embodiment of the method may also include any of the following: capturing the first and second image data independent of mechanical parts configured to dynamically adjust optical paths of the light received from the first and second fields of view; directing the combined light toward the imager such that the combined light is focused onto substantially all of the two-dimensional imaging plane; directing the combined light toward the imager such that the combined light is focused onto a common portion of the imager; directing the combined light toward the imager such that the combined light is not directed toward different portions of the imager; in response to receiving a request to adjust the illumination-control rate from a first value to a second value that is different from the first value, adjusting the illumination-control rate to the second value; or in response to receiving a request to adjust the image-capture rate from a first value to a second value that is different from the first value, adjusting the image-capture rate to the second value.

In another embodiment of the method in which the illumination-control rate comprises a first illumination-control rate, the method further comprises producing a third series of timing pulses timed according to a second illumination-control rate; and changing intensity of light received from the second field of view in response to the third series of timing pulses. In some embodiments, the first and second illumination-control rates have frequencies of approximately 90 hertz and the image-capture rate has a frequency of approximately 60 frames per second. In other embodiments, the first and second illumination-control rates have frequencies of approximately 60 hertz and the image-capture rate has a frequency of approximately 60 frames per second, and the method further comprises delaying alternate timing pulses of the first and third series of timing pulses.

In some embodiments, a wavelength of the light received from the first field of view is approximately equal to that of the light received from the second field of view. Optionally, the second exposure has a duration greater than that of the first exposure; the first image data may comprise a single image and the second image data comprises two or more images; or one of the first or second inspection regions corresponds to a checker side of the data reader while the other one of the first or second inspection regions corresponds to a customer side of the data reader.

Also disclosed is an embodiment of a data reader having a first field of view for a first inspection region, a second field of view for a second inspection region spaced apart from the first inspection region, and an imager including a two-dimensional imaging plane to produce—based light received from the respective first and second fields of view—first and second image data representing the respective first and second inspection regions. The embodiment includes an illumination source to illuminate the first inspection region in response to a first series of timing pulses produced according to an illumination-control rate; a beam splitter configured to combine light from the first field of view with light from the second field of view; a lens to receive the combined light from the beam splitter, and to focus the combined light onto the two-dimensional imaging plane of the imager; and circuitry configured to produce the first series of timing pulses and to produce a second series of timing pulses timed according to an image-capture rate, the image-capture rate and the illumination-control rate being timed so that the illumination source illuminates the first field of view during a first exposure of the imager to obtain first image data from the two-dimensional imaging plane corresponding to the first inspection region, and so that the illumination source is inactive during at least some of a second exposure of the imager to obtain second image data from the two-dimensional imaging plane corresponding to the second inspection region.

In some embodiments of the data reader, the illumination source comprises a first illumination source, the illumination-control rate comprises a first illumination-control rate, and the data reader further includes a second illumination source to illuminate the second inspection region in response to a third series of timing pulses produced according to a second illumination-control rate, the image-capture rate and the second illumination-control rate timed so that the second illumination source illuminates the second field of view during the second exposure of the imager.

In yet other embodiments of the data reader, at least a portion of the first and second fields of view do not overlap; or the first and second fields of view do not overlap.

Additional aspects and advantages will be apparent from the following detailed description of preferred embodiments, which proceeds with reference to the accompanying drawings.

BRIEF DESCRIPTION OF THE DRAWINGS

FIGS. 5-9 are timing diagrams illustrating frame exposure timing for a data reader and pulse timing of illumination sources, according to various embodiments.

DETAILED DESCRIPTION OF EMBODIMENTS

With reference to the above-listed drawings, this section describes particular embodiments and their detailed construction and operation. The embodiments described herein are set forth by way of illustration only and not limitation. Those skilled in the art will recognize in light of the teachings herein that, for example, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments. Various types of data acquisition devices, such as optical code readers, are generally known including imaging-based data readers and laser scanners, both fixed and handheld. For the purposes of the present description, the terms scanner and data reader may be used interchangeably.

Figure 1:
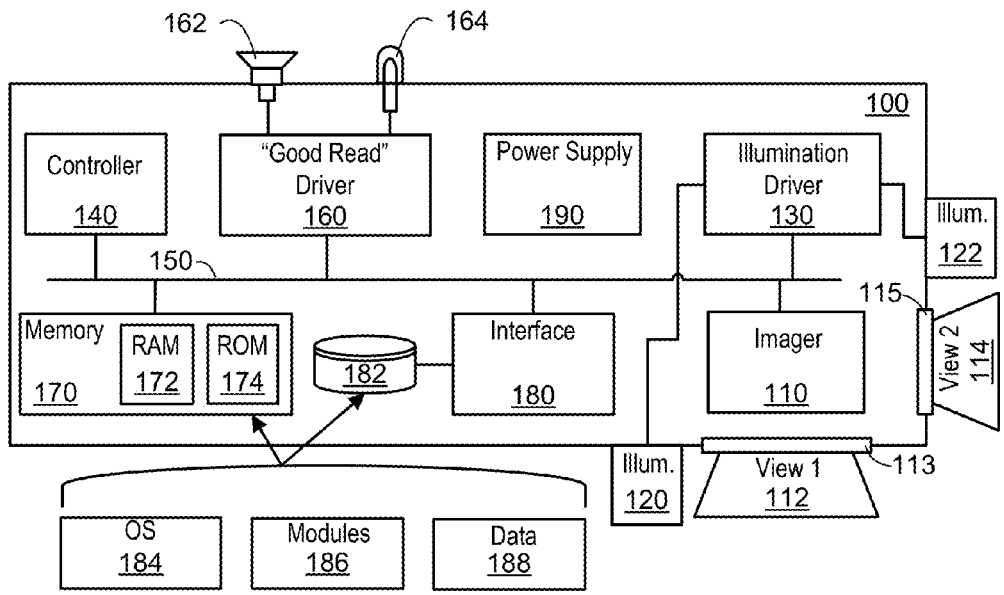
FIG. 1 is a block diagram of a data reader, according to one embodiment.

FIG. 1 is a block diagram of a data reader 100, according to one embodiment. The data reader 100 includes an imager 110, which captures images of fields of view 112 and 114 through windows 113 and 115, respectively. In one embodiment, the fields of view 112 and 114 are focused onto the imager 110 and the fields of view 112 and 114 do not overlap in the read region. In other embodiments, however, some overlap between the fields of view 112 and 114 is tolerable, provided the redundancy between the fields of view 112 and 114 does not prevent a successful decode of an optical code. Regardless of the degree of overlap (or no overlap), image frames captured by the imager 110 may include light emanating from the field of view 112, 114, or both.

In some embodiments, the fields of view 112 and 114 correspond to opposing lateral sides of a checkstand. The lateral sides are referred to as a checker side (because it may be in proximity to a checkout clerk, or operator such as a merchant-clerk), and a customer side (because it may be in proximity to a customer). The customer side, however, may comprise a first side facing one of the fields of view 112 or 114, while the checker side comprises a second side facing the other one of the fields of view 112 or 114. For example, in self-checkout systems, a customer typically operates the data reader 100 and is therefore also self-checkout customer clerk. In such cases, the customer side may be considered a first side and the checker side may be considered a second side opposite (or spaced apart from) the first side.

The data reader 100 includes illumination sources 120 and 122, which are configured to illuminate the fields of view 112 and 114, respectively. To help differentiate between the fields of view 112 and 114, the data reader 100 may cause the illumination source 120 to illuminate the field of view 112 when an image is to be captured of the field of view 112 and the data reader 100 may cause the illumination source 122 to illuminate the field of view 114 when an image is to be captured of the field of view 114. For example, if the imager 110 captures an image at approximately the same time as an illumination driver or controller 130 causes the illumination source 120 to illuminate the field of view 112, the captured image should include details of objects within the field of view 112 (but not the field of view 114 because there should be little or no light emanating therefrom).

In a similar vein, if the imager 110 captures an image at approximately the same time as when the illumination driver 130 causes the illumination source 122 to illuminate the field of view 114, the captured image should include details of objects within the field of view 114 (but not the field of view 112 because there should be little or no light emanating therefrom). According to one embodiment, the illumination provided by the illumination sources 120 and 122 is between approximately 15 times and approximately 25 times greater than the ambient illumination, and preferably approximately 20 times greater than the typical ambient illumination (i.e., illumination generating an output from imager 110 but not provided by illumination sources 120 and 122). For example, if the typical ambient illumination is in a range from approximately 150 lux to approximately 300 lux and thereby generates a corresponding eight-bit grayscale output from imager 110 in a range from approximately 5 to approximately 10 (out of 255), the illumination sources 120 and 122 may generate approximately 2,000 to 6,000 lux (or 100 to 200 in eight-bit grayscale). In some embodiments, an narrow bandpass optical filter can be used to further reduce the ambient light effect in a captured image.

Through time division exposure of the imager 110 and spatial division of the illumination of the fields of view 112 and 114, the data reader 100 can utilize all or most of the imaging surface of the imager 110 to capture images of the field of view 112 and images the field of view 114. In other words, in a data reader having multiple fields of view, a single imager can be used to capture multiple whole views without the use of moving parts, such as a mechanical shutter that blocks one view while an image of the other view is being captured or a movable mirror that switches between projecting the different fields of view onto the imager. Moreover, the illumination sources 120 and 122 can have the same or approximately the same wavelength. Further, the imager 110 does not need to be divided into multiple partial views (e.g., half of the imager 110 dedicated to the field of view 112 and the other half of the imager 110 dedicated to capturing the field of view 114).

The imager 110 forms an electronic image of the fields of view 112 and 114. The imager 110 may be included in a digital camera or other imager assembly that may include associated optics. The imager 110 may comprise a wide range of image sensing devices for converting an optical image (or another wavelength in the electromagnetic spectrum) into an electrical signal. For example, the imager 110 may comprise a digital sensor, such as a charge-coupled device (CCD) imager or complimentary metal-oxide semiconductor (CMOS) imager, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the imager 110 has been exposed to light emanating from one or more of the fields of view 112 and 114, data from all the pixels can be sequentially read out in a selectable pattern (which may be row-by-row, column-by-column, or some other pattern). The pixel intensity data may optionally be converted to digital form using an analog-to-digital converter.

One suitable imager is the model EV76C560 CMOS sensor offered by e2v Technologies PLC, Essex, England (http://www.e2v.com), for example. Other suitable imagers or camera devices may be employed, such as the model MT9V022 sensor sold by Micron Technology, Inc. of Boise, Id. In response to receiving an instruction from a controller 140, the imager 110 captures or acquires one or more images of the field of view 112 of a view volume associated with the window 113 (e.g., at the same time as or approximately the same time as the illumination source 120 illuminates the field of view 112) and one or more images of the field of view 114 of a view volume associated with the window 115 (e.g., at the same time as or approximately the same time as the illumination source 122 illuminates the field of view 114). According to one embodiment, the view volumes associated with windows 113 and 115 form a scan volume of the data reader 100. Conceptually, the scan volume includes a portion of space in front the windows 113 and 115 in which optical codes may be read (e.g., detected and decoded) by the data reader 100. In other words, the scan volume may be referred to as a view volume within which there is a relatively high probability of a successful scan/read.

The illumination sources 120 and 122 comprise any suitable source of light, such as one or more light emitting diodes (LEDs), flash strobes, incandescent or fluorescent lamps, or halogen bulbs. The illumination sources 120 and 122 preferably generate the same or approximately the same wavelength of light. For example, the illumination sources 120 and 122 may illuminate the fields of view 112 and 114 with light having one or more wavelengths within a wavelength band of approximately 380 nm to approximately 750 nm (i.e., white light), light having wavelengths within a wavelength band of approximately 620 nm to approximately 750 nm, and preferably a peak wavelength of approximately 670 (+/−10) nm (i.e., red light), and/or light having wavelengths within a wavelength band of approximately 700 nm to approximately 300 μm, and preferably a peak wavelength of approximately 850 nm (i.e., infrared light). According to other embodiments, the illumination sources 120 and 122 generate different wavelengths of light (e.g., the illumination source 120 may generate white light while the illumination source 122 generates infrared light). According to one embodiment, the illumination sources 120 and 122 include an LED with a narrow spectrum, such as deep red having a peak wavelength of approximately 660 nm, or a far red with a peak wavelength of approximately 680 nm. With such a narrow spectrum, a band pass filter may be used in front of a focusing lens of imager 110 to help reject additional ambient light. A light source producing light having a wavelength close to infrared also helps reduce distractions for users.

One or more illumination drivers or controllers 130 are optionally provided. While a single illumination driver 130 is illustrated in FIG. 1 to drive the illumination sources 120 and 122, two illumination drivers may be provided (one of which drives the illumination source 120 and the other one of which drives the illumination source 122). The illumination driver 130 is configured to apply signals to the illumination sources 120 and 122 to, for example, strobe the illumination sources 120 and 122 at desired times or to light the illumination sources 120 and 122 constantly for a period of time. According to a preferred embodiment, the illumination driver 130 drives the illumination sources 120 and 122 with a series of illumination pulses having a given pulse width. In one example, the pulse width is approximately 125 μs, but the pulse width depends on label-motion tolerance and can therefore include a range of suitable pulse widths from approximately 10 μs to approximately 600 μs. In general, increasing the pulse width increases the perceived intensity of illumination by increasing the percentage of time during which the illumination sources 120 and 122 are on (i.e., by increasing the duty cycle of the illumination waveform). The illumination source 120, illumination source 122, or both may be omitted in certain embodiments. The illumination sources 120 and 122 may be mounted within a housing of the data reader 100 (e.g., behind windows 113 and 115) or may be mounted external to the housing, such as on an exterior surface of the housing or remotely located from the data reader 100. For example, the illumination sources 120 and 122 may be mounted to a separate stand or another part of the checkout stand and positioned some distance from the data reader 100.

The imager 110 and the illumination driver 130 connect to the controller 140, which may be, for example, a processor, microprocessor, controller, microcontroller, or the like. The connection may be via a bus 150 or other communication mechanism, such as direct connections of a serial, parallel, or other type. The controller 140 generally controls and coordinates the operation of other devices to which it is connected, such as one or more of the imager 110, the illumination driver 130, and a "good read" driver 160. The "good read" driver 160 is optionally included to drive a beeper 162 (or buzzer, speaker, or other audible indicator) to produce an audible "beep" or other indication when an optical code is successfully read. In addition, or alternatively, the "good read" driver 160 drives an LED 164 or other visual indicator when an optical code has been successfully read. Other devices or subsystems, such as a cash register or electronic scale, may also be connected to the controller 140. Moreover, the controller 140 and/or the bus 150 may interface with other controllers or computers, such as a cash register system or checkout terminal.

The data reader 100 also includes memory 170, which may be implemented using one or more standard memory devices. The memory devices may include, for instance, RAM 172, ROM 174, and EEPROM devices, and may also include magnetic or optical storage devices, such as hard disk drives, flash memory, CD-ROM drives, and DVD-ROM drives. The data reader 100 may also include an interface 180 coupled to an internal memory, such as a hard disk drive 182. In addition, or alternatively, the interface 180 may be coupled to flash memory, an optical disk drive, or another memory or drive and may be configured for external drive implementations, such as over a USB, IEEE 1194, or ExpressCard connection.

According to one embodiment, any number of program modules are stored in the drives (e.g., drive 182) and the memory 176, including an operating system (OS) 184, one or more application programs or modules 186, such as instructions to implement the methods described herein, and data 188. Any suitable operating system 184 may be employed.

One of the program modules 186 may comprise a set of instructions to implement the methods for generating image data using a data reader having multiple fields of view described herein. For example, one of the program modules 186 may comprise a set of instructions to implement the method 400 illustrated in FIG. 4, or the method 2000 illustrated in FIG. 20. The data 188 may include one or more configuration settings or parameters, such as the illumination setting or settings associated with illuminating the fields for view 112 and 114 and image capture settings associated with capturing images via the imager 110. The data 188 may also include image data from the imager 120 and decoded optical code data.

The data reader 100 may include a number of other components that interface with one another via the bus 150, including a display controller and display device, an input controller, and a network interface. The display controller and display device may be provided to present data, menus, and prompts, and otherwise communicate with the user via one or more display devices, such as a transmissive or reflective liquid crystal display (LCD) or other suitable display. For example, the display controller and display device may be configured to display a navigable menu system or graphical user interface (GUI) that allows the user to select the illumination and image capture settings.

The input controller may be configured to receive user input from one or more input devices, such as a keyboard, a pointing device, or other wired/wireless input devices, that allow the user to, for example, select the illumination setting or settings or otherwise configure the data reader 100. Other input devices may be included, such as a microphone, touch-screen, touchpad, and trackball. While the input devices may be integrated into the data reader 100 and coupled to the controller 140 via the input controller, input devices may also connect via other interfaces, such as a connector that includes one or more data interfaces, bus interfaces, wired or wireless network adapters, or modems for transmitting and receiving data. Accordingly, the input controller may include one or more of hardware, software, and firmware to implement one or more protocols, such as stacked protocols along with corresponding layers. Thus, the connector may function as one or more of a serial port (e.g., RS232), a Universal Serial Bus (USB) port, and an IR interface. The input controller may also support various wired, wireless, optical, and other communication standards.

The network interface may optionally be provided to communicate with one or more hosts or other devices (e.g., a computer, a point-of-sale terminal, a point-of-sale computer system, or a cash register). For example, data gathered by or decoded by the data reader 100 may be passed along to a host computer. According to one embodiment, the network interface comprises a universal interface driver application specific integrated circuit (UIDA). Further details of the UIDA can be found in U.S. Pat. No. 6,877,663. The network interface may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radiofrequency identification (RFID).

The data reader 100 may also include one or more power supplies 190, which provide electrical power to the various components of the data reader 100 via power connections.

Data readers according to other embodiments may have less than all of these components, may contain other components, or both. For example, the data reader 100 may comprise a fixed scanner, such as an on-counter scanner or in-counter scanner, or a portable scanner, such as a handheld scanner. In addition, the data reader 100 may include a radiofrequency identification (RFID) reader or a magnetic stripe reader.

Figure 2:
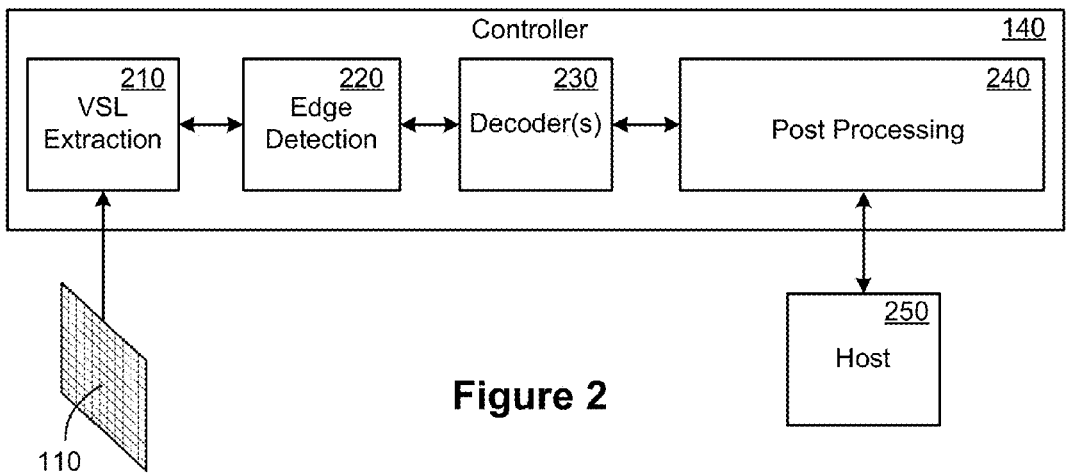
FIG. 2 is a block diagram illustrating various components used to process images captured by the imager in FIG. 1, according to one embodiment.

FIG. 2 is a block diagram illustrating various components used to process images captured by the imager 110 in FIG. 1, according to one embodiment. Preferably, only a select portion (e.g., every Nth row) or sub-region of the image data captured by the imager 110 corresponding to one or more sub-regions is stored and processed. Optionally, the select portion or sub-region may be stored in a memory, such as memories 170 or 182. According to another embodiment, all of the image data captured by the imager 110 may be used to search for and decode an optical code (e.g., using any suitable two-dimensional decoding algorithm). The controller 140 may optionally include or execute a sub-region or virtual scan line extraction module 210 to read or assemble samples or pixels from the imager 110 lying along one or more lines or other defined paths across the image at predetermined angles with respect to one another or in another desired scan pattern. The sub-region extraction module 210 may define and map sub-regions onto a raster pattern, thereby allowing the pixels of the raster which fall on the sub-regions to be identified and processed for decodable data, and possibly stored for later processing. Storing only a select portion of the image data corresponding to sub-regions reduces the total amount of data that needs to be stored and processed. Additional virtual scan line processing techniques may be implemented, such as the virtual scan line processing techniques that are described in U.S. Pat. No. 6,142,376. The extraction module 210 may be omitted in certain embodiments, such as when a two-dimensional decoding algorithm is used.

An edge detection module 220 identifies edge transition locations in the extracted data using any suitable edge detection technique. For example, after an image has been captured by the imager 110, the image may be represented by a certain number of pixels, each of which is represented by a certain value. For a grayscale image where each pixel is represented by 8 bits, a pixel may have a value ranging from 0 (black) to 255 (white) with various shades of gray between 0 and 255. While the image may be a grayscale image, it may also be a color image or a black-and-white image. Additionally, while each pixel may be represented by 8 bits, each pixel may be represented by any number of bits (e.g., 10 bits or 12 bits). Because edges in images generally have strong intensity contrasts, an increase (or decrease) in intensity from one pixel to the next is indicative of an edge. Accordingly, many edge detection techniques involve calculating a derivative of the intensity changes in pixel values (e.g., intensity changes between a first pixel and an adjacent pixel or more than one adjacent pixels). With regard to a first derivative, an edge transition can occur at a local maxima or minima. With regard to second derivatives, edges occur at zero crossings. Thus, edges may be located by convolving image data with a kernel that approximates a first or second derivative.

Based on the edge locations, one or more decoders 230 (e.g., low level decoders, high level decoders, or any combination thereof) may convert the sequence of edges and spacing between the edges into data usable by a host 250. For example, a low level decoder may convert the sequence of edges and spacing between the edges into a set of barcode elements, such as start patterns, stop patterns, and codewords, and a high level decoder may convert the barcode elements into decoded characters, which may be alphanumeric. The specific nature of the decoder(s) varies depending on the particular symbology used to encode the data. For example, in the PDF417 symbology, data is encoded by converting data into codewords (i.e., high level encoding) and representing the codewords with a certain sequence of bars and spaces (i.e., low level encoding). Thus in the PDF417 symbology, data may be decoded by converting the sequence of bars and spaces into codewords (i.e., low level decoding) and converting the codewords into data (i.e., high level decoding). Thus, after the edge detection module 220 identifies edges in the data captured by the imager 110, the relative locations of the edge transitions can be converted back into codewords via a low level decoder and the codewords can be converted into data usable by the host 250 by a high level decoder. The controller may include or execute a set of decoders 230 for each symbology the data reader 100 is configured to read. The decoder 230 may also combine partial sections of an optical code to form data representing the complete optical code using a process known as stitching, further details of which can be found in U.S. Pat. No. 5,493,108.

One or more of the extraction module 210, the edge detection module 220, or the decoder 230 may be replaced by a vision library module that is configured to find a decodable feature of an optical code, such as start characters, stop characters, center characters, guard characters, and check characters. After the decodable feature is located, the vision library module attempts to decode the optical code by processing data in one or more directions extending away from the decodable feature.

The controller may include or execute a post processing module 240 to further process the output from the decoder(s) 230 before sending the data to the host 250. For example, the post processing module 240 may include an amplification module to amplify one or more spatial frequencies, a filtering module, and/or a timer module. The timer module may be used to indicate when to stop attempting to find characters. For example, to maximize throughput, the timer module may begin measuring a time interval at some event such as the start of decoding data from an image frame, or the detection of a potential optical code within an image frame, and the edge detection module 220, the decoder(s) 230, or both, may stop looking for characters after a certain period of time or after a certain number of data frames have been captured. In other words, the timer module prevents the edge detection and decoder modules from spending too much time trying to decode data that is not readable or decodable (or at least not easily readable or decodable) or that has already been decoded.

According to one embodiment, the data reader 100 transmits the decoded optical code data to the host 250 or another device (e.g., a computer, a point-of-sale terminal, a point-of-sale computer system, or a cash register). The transmission may be performed in a point-to-point manner or may be broadcast over a wired or wireless network. The host (or another device) may present data, prompts, and otherwise communicate with the user via one or more display devices. For example, the host (or another device) may present the decoded data to the user via a display, such as the object type (e.g., product type) corresponding to the scanned optical code and data associated with the object type (e.g., a price of the product). The data associated with the object type may be encoded in the optical code or accessed from a local or remote database based upon the object type. By way of another example, the host (or another device) may cause the decoded data to be recorded on a tangible medium. For example, the host (or another device) may instruct a printer to print the object type and data corresponding to the object type (e.g., print the product type and associated price on a receipt). The data reader 100 may also store the decoded optical code data in memory 170, memory 182, or both memories 170 and 182. For example, if the data reader is operating in a portable mode or the host is unavailable, the decoded data may be buffered by the data reader for later transmission in a batch mode. Additionally, the data reader may acknowledge that optical code data has been successfully decoded, such as by sounding a beep customarily associated with data readers.

Figure 3:
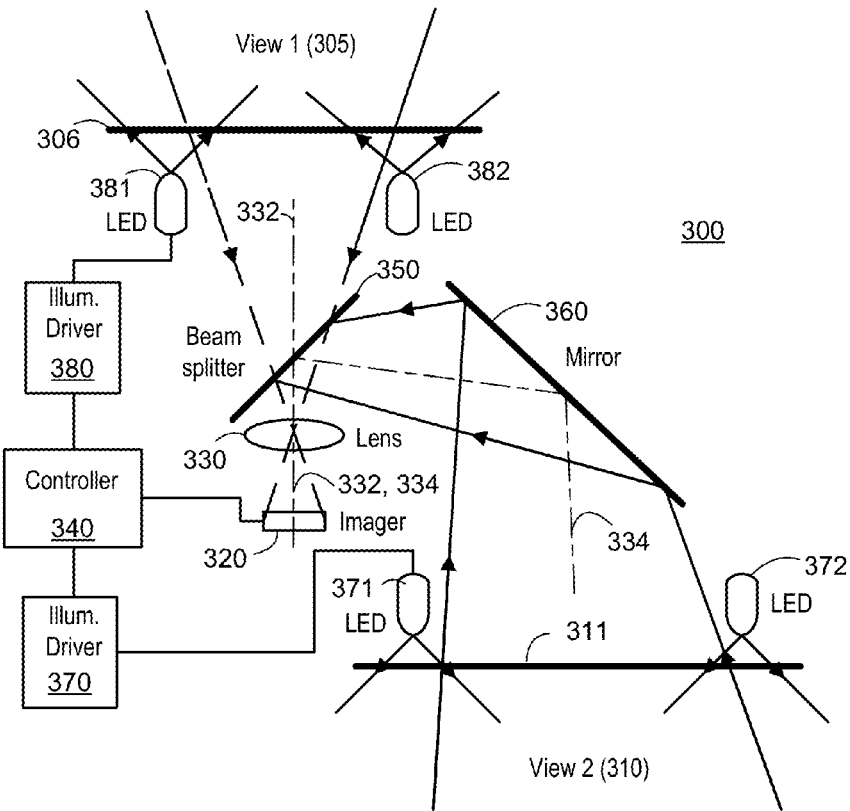
FIG. 3 is a schematic diagram illustrating a top view of a data reader having multiple fields of view, according to one embodiment.

FIG. 3 is a schematic diagram illustrating a top view of a data reader 300 having fields of view 305 and 310. The data reader 300 is similar to the data reader 100 described with reference to FIG. 1, but illustrates a back-to-back configuration having a single imaging chain. The data reader 300 may include any of the components described with reference to FIG. 1, such as the memories 170 and 182, the good read driver 160, and the power supply 190.

The data reader 300 includes an imager 320, which is similar or identical to the imager 110 described with reference to FIG. 1. A lens assembly 330 is provided to focus light emanating from the fields of view 305 and 310 onto the imager 320. The lens assembly 330 may comprise a single optical element, or may comprise an array of optical elements. An array of optical elements may be positioned in alignment along a common optical axis or positioned so that the optical elements are spaced apart from each other along different optical axes. The lens assembly 330 may also comprise a zoom lens coupled to a controller 340 to control an amount of optical zoom.

A beam splitter 350 is positioned along optical axes 332 and 334 (i.e., first path 332 and second path 334) in optical association with the lens assembly 330 and the imager 320. The beam splitter 350 directs light emanating from the field of view 305 along the first path 332 toward the lens assembly 330 and the imager 320, and light emanating from the field of view 310 along the second path 334 toward the lens assembly 330 and the imager 320. In the configuration illustrated in FIG. 3, the beam splitter 350 allows light emanating from the field of view 305 to pass through the beam splitter 350 toward the lens assembly 330 and the imager 320, while light from the field of view 310 is reflected by the beam splitter 350 toward the lens assembly 330 and the imager 320. Thus, the imager 320 can simultaneously capture light emanating from the fields of view 305 and 310.

According to one embodiment, the beam splitter 350 is approximately 50% reflective and approximately 50% transmissive. According to other embodiments, the beam splitter 350 is configured to direct more light emanating from one of the fields of view 305 and 310 toward the lens assembly 330 and the imager 320 in comparison to the other one of the fields of view 305 and 310. For example, the beam splitter 350 may be between approximately 20-30% reflective and between approximately 70-80% transmissive (or between approximately 70-80% reflective and between approximately 20-30% transmissive). If the field of view 305 is directed toward a merchant-clerk side of the data reader 300 and the field of view 310 is directed toward a customer side of the data reader 300, it may be desirable for the beam splitter 350 to be approximately 30% reflective and approximately 70% transmissive so that optical codes within the field of view 305 stand a better chance of being captured and decoded. In other single-view data reader embodiments, the beam splitter 350 may be replaced with a mirror.

The beam splitter 350 may include a glass plate beam splitter, a plastic plate beam splitter, or bulk optics such as polarizing beam splitter cubes or partially reflecting mirrors. Acousto-optic deflectors (AODs), electro-optic deflectors (EODs), and switchable liquid crystal display (LCD) polarizers may also be configured and driven (e.g., via the controller 340 or another suitable device) to perform beam splitting.

A mirror 360 is provided and aligned with the beam splitter 350 and a window 311 associated with the field of view 310 such that light emanating from the field of view 310 is reflected by the mirror 360 toward the beam splitter 350, the lens assembly 330, and the imager 320. The mirror 360 is preferably highly reflective so that all or substantially all of the light emanating from the field of view 310 is directed toward the beam splitter 350.

The data reader 300 includes an illumination driver 370 electrically coupled to the controller 340 and LEDs 371 and 372 (the connection between LED 372 and the illumination driver 370 is not illustrated in FIG. 3). An illumination driver 380 is also electrically coupled to the controller 340 and LEDs 381 and 382 (the connection between LED 382 and the illumination driver 380 is not illustrated in FIG. 3). The LEDs 371, 372, 381, and 382 may be similar or identical to the illumination sources 120 and 122 described with reference to FIG. 1 and may comprise any suitable source of light, such as one or more LEDs, flash strobes, incandescent or fluorescent lamps, or halogen bulbs. While the LEDs 371 and 372 are located behind the window 311 and LEDs 381 and 382 are located behind a window 306, the LEDs 371, 372, 381, and 382 may be mounted through a housing of the data reader 300, mounted to the housing of the data reader 300, or remotely located from the data reader 300. The LEDs 371 and 372 are configured to illuminate the field of view 310 and the LEDs 381 and 382 are configured to illuminate the field of view 305. A different number of LEDs may be provided for the fields of view 305 and 310. For example, there may be two or more LEDs associated with the field of view 305 and only one LED associated with the field of view 310 (e.g., for reading optical codes from a display device of a cellular telephone).

The controller 340, which may be similar or identical to the controller 140 described with reference to FIG. 1, is configured to control the operation of the imager 320, the illumination drivers 370 and 380, and other data reader components. For example, to help differentiate between whether a captured image includes details of the field of view 305 or the field of view 310, the controller 340 may cause the LEDs 371 and 372 to illuminate the field of view 310 when an image is to be captured of the field of view 310 and the controller 340 may cause the LEDs 381 and 382 to illuminate the field of view 305 when an image is to be captured of the field of view 305. As illustrated in FIG. 3, the fields of view 305 and 310 do not overlap. Thus, when the LEDs 371 and 372 are on, the LEDs 371 and 372 illuminate the field of view 310 but not the field of view 305. In a similar vein, when the LEDs 381 and 382 are on, the LEDs 381 and 382 illuminate the field of view 305 but not the field of view 310.

The spatial division or separation of the illumination provided by the LEDs 371 and 372 and the illumination provided by the LEDs 381 and 382 helps ensure that a captured image includes details of objects within the field of view 310 (but not the field of view 305) when the imager 320 captures the image at approximately the same time as the illumination driver 370 causes the LEDs 371 and 372 to illuminate the field of view 310. Similarly, the spatial division helps ensure that a captured image includes details of objects within the field of view 305 (but not the field of view 310) when the imager 320 captures the image at approximately the same time as the illumination driver 380 causes the LEDs 381 and 382 to illuminate the field of view 305.

The LEDs 371, 372, 381, and 382, the lens assembly 330, the imager 320, the controller 340, and the memory included with the data reader 300 form the imaging chain components of the data reader 300. The imaging chain components account for the majority of the cost of the data reader 300. Thus, it is desirable to minimize the number of imaging chain components to help reduce the cost of the data reader 300. By using the lens assembly 330, the imager 320, the controller 340, and the memory associated with the controller 340 to capture and process images of multiple fields of view, the data reader 300 can effectively do the work of multiple data readers. Having the data reader 300 capture and process images of multiple fields of view can be achieved through time division exposure of the imager 320 (i.e., multiplexing in the time domain instead of multiplexing in the space domain). For example, while the imager 320 may be capable of capturing images or frames at a frame rate of 60 fps, capturing images at a frame rate of 30 fps may provide a scanner throughput that is suitable for most applications. For typical applications, a frame rate of 30 fps can accommodate an optical code label sweep speed of approximately 100 inches per second, providing about 39.3 million pixels per second of throughput, according to some data reader optical designs that include a 1280×1024 imager. By capturing images of the fields of view 305 and 310 in an alternating manner or interleaved manner (i.e., capturing an image of field of view 305, capturing an image of field of view 310, capturing an image of field of view 305, and so forth), images can be captured from fields of view 305 and 310 at a frame rate that results in a suitable throughput for both fields of view 305 and 310.

Capturing images from multiple fields of views can be achieved in various ways, such as by using wavelength separation, by blocking one field of view while capturing an image of the other field of view, and by having different portions of an imaging surface of the imager 320 dedicated to different fields of view. Wavelength separation can be achieved by using a filter. For example, the filter can be used so that only red light from a first field of view is directed toward a color imager, blue light from a second field of view is directed toward the color imager, and green light from a third field of view is directed toward the color imager. When an object is placed in close proximity to the data reader, the red sensor pixels of the color imager produce a red set of image data representing an image of the first view, the blue sensor pixels of the color imager produce a blue set of image data representing an image of the second view, and the green sensor pixels of the color imager produce a green set of image data representing an image of the third view. The red, green, and blue sets of image data can be processed separately to decode an optical code of the object. One disadvantage of wavelength separation is that most optical codes are printed and optimized to be scanned and decoded using a red (e.g., a traditional laser) light source. Thus, the data reader may not be able to read some of the optical codes captured using the green and blue channels.

One disadvantage of using a mechanical shutter to block one field of view while an image is captured of the other field of view is that the mechanical shutter adds cost to the data reader and may be less reliable due to the moving part(s). One disadvantage of directing multiple fields of view onto different portions of an imager is that an image captured of each field of view uses only a fraction of the usable imaging surface of the imager and, as a result, the optical codes in the fields of view may be more difficult to process due to their reduced resolution. Using time division exposure of the imager 320 and spatial division of the illumination of the fields of view 305 and 310, the data reader 300 can utilize all or most of the imaging surface of the imager 320 to capture images of the field of view 305 and images the field of view 310. In other words, in a data reader having multiple fields of view, a single imager can be used to capture multiple whole views without the use of moving parts, such as a mechanical shutter that blocks one view while an image of the other view is being captured or a movable mirror that switches between projecting the different fields of view onto the imager. Moreover, the LEDs 371, 372, 381, and 382 can have the same or approximately the same wavelength (e.g., approximately 630 nm, approximately 660 nm, or approximately 720 nm). Further, the imager 320 does not need to be divided into multiple partial views (e.g., half of the imager 320 dedicated to the field of view 305 and the other half of the imager 320 dedicated to capturing the field of view 310).

Figure 4:
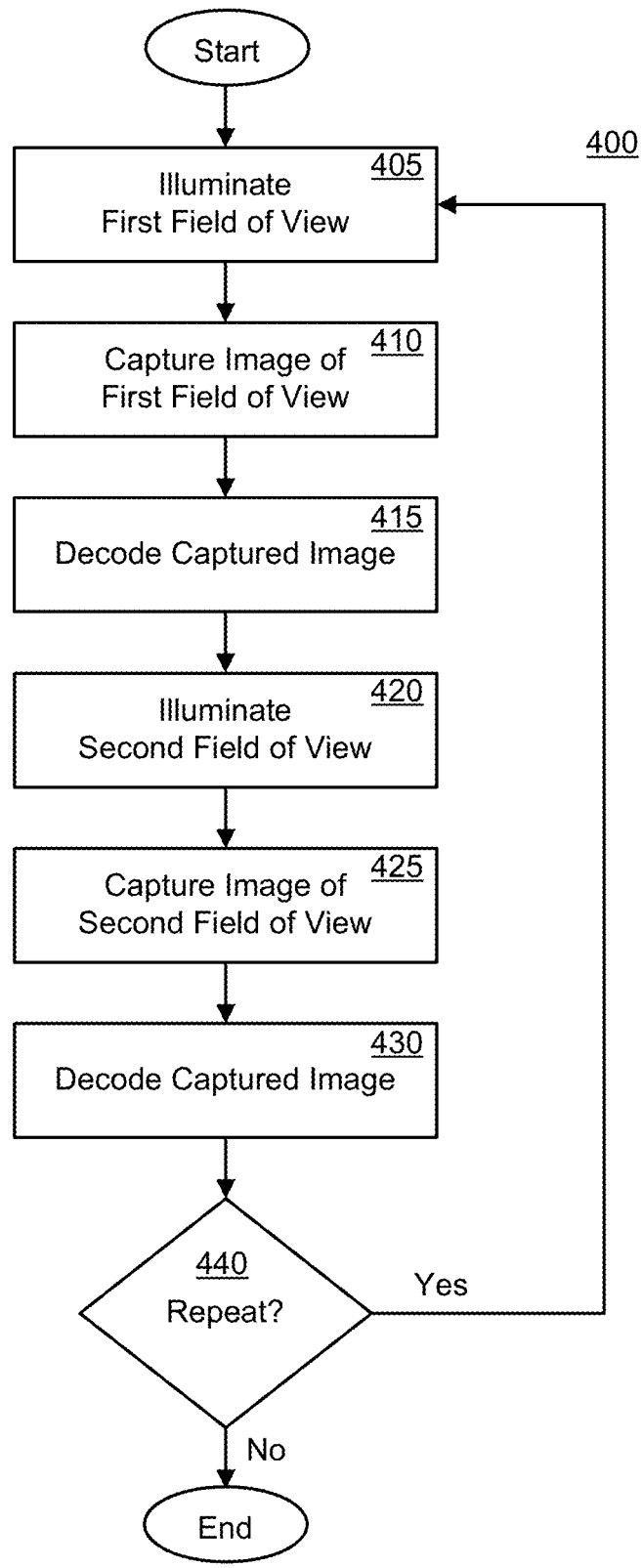
FIG. 4 is a flow chart of a method for generating image data using a data reader having multiple fields of view, according to one embodiment.

The operation of the data reader 300 will now be described with reference to FIGS. 3-9 and 20. Referring to FIG. 4, a method 400 for generating image data using the data reader 300 is illustrated according to one embodiment. At step 405, a first field of view of the data reader 300 is illuminated. For example, the illumination driver 380 may drive the LEDs 381 and 382 with an illumination-driving waveform to cause the LEDs 381 and 382 to emit an optical pulse or a series of optical pulses. The illumination-driving waveform may include a single electrical pulse or a plurality of electrical pulses, each of which has a fixed pulse width that is generated at a predetermined frequency. The LEDs 381 and 382 are turned on during each of the electrical pulses, and the LEDs 381 and 382 are turned off between each of the electrical pulses. In certain embodiments, the pulse widths, the frequencies, or the pulse widths and the frequencies of the illumination-driving waveform may be programmable. In addition, the pulse widths, the frequencies, or the pulse widths and the frequencies of the illumination-driving waveform may be controlled to vary from one pulse to another pulse. As will be described in more detail with respect to FIGS. 12 and 13, the illumination driver 380 may cause the LEDs 381 and 382 to illuminate the field of view 305 in response to one or more signals from the controller 340, a complex programmable logic device (CPLD), a field-programmable gate array (FPGA), or a combination of control devices.

At step 410, an image of the first field of view is captured. For example, the controller 340 may cause the imager 320 to capture a single image or capture multiple images at an image capture rate (e.g., 60 fps). By way of another example, the imager 320 may already be capturing images at the image capture rate and the image captured at step 410 is the next image captured at the image capture rate or the previous image captured at the image capture rate. Because the LEDs 381 and 382 illuminate the field of view 305 at the same time or approximately the same time as the imager 320 captures an image, the captured image should include objects (e.g., optical codes) within the field of view 305, but not the field of view 310. Accordingly, the field of view 310 should be dark relative to the field of view 305 because LEDs 371 and 372 do not illuminate the field of view 310 at same time as LEDs 381 and 382 illuminate the field of view 305. Thus, an image is readily decodable when the field of view 310 includes illumination (e.g., ambient light) that is approximately 1/10th of the illumination included in the field of view 305 (e.g., LED illumination).

At step 415, the image captured at step 410 is processed to determine whether the captured image contains decodable data corresponding to one or more optical codes. Any suitable technique may be used to identify decodable data. For example, pixel data corresponding to one or more sub-regions (e.g., virtual scan lines) of the captured image may be processed to locate edge transitions and to attempt to decode the captured image based on the edge transition locations (e.g., using a low level decoder, a high level decoder, or both). By way of another example, a two-dimensional decoding algorithm may be used to determine whether the captured image contains decodable data corresponding to an optical code. Any suitable two-dimensional decoding algorithm may be used. Preferably, the two-dimensional decoding algorithm is configured to process the captured image to identify (and optionally decode) optical codes within the captured image. Additional details regarding two-dimensional decoding algorithms and example two-dimensional decoding algorithms can be found in international standards associated with symbology types, such as ISO/IEC 16022:2006, entitled "Information technology—Automatic identification and data capture techniques—Data Matrix bar code symbology specification", available from the International Organization for Standardization (ISO) in Geneva, Switzerland. According to one embodiment, the captured image is not decoded at step 415. For example, the captured image may be processed to determine whether the captured image contains or is likely to contain decodable data, such as when the relative locations of edge transitions and spaces there between yield at least one valid character, codeword, or overhead character, or when a minimum number of edge transitions are detected. If the captured image contains or is likely to contain decodable data, the captured image may be stored in a memory (e.g., memory 170 or 182 in FIG. 1) for later processing and decoding. According to another embodiment, the captured image is decoded at step 415 using a suitable decoder (e.g., decoder(s) 230 in FIG. 2).

At step 420, a second field of view of the data reader 300 is illuminated. For example, the illumination driver 370 may drive the LEDs 371 and 372 with an illumination-driving waveform to cause the LEDs 371 and 372 to emit an optical pulse or a series of optical pulses. The illumination-driving waveform may include a single electrical pulse or a plurality of electrical pulses, each of which has a fixed pulse width that is generated at a predetermined frequency. The LEDs 371 and 372 are turned on during each of the electrical pulses, and the LEDs 371 and 372 are turned off between each of the electrical pulses. In certain embodiments, the pulse widths, the frequencies, or the pulse widths and the frequencies of the illumination-driving waveform may be programmable. In addition, the pulse widths, the frequencies, or the pulse widths and the frequencies of the illumination-driving waveform may be controlled to vary from one pulse to another pulse. As will be described in more detail with respect to FIGS. 12 and 13, the illumination driver 370 may cause the LEDs 371 and 372 to illuminate the field of view 310 in response to one or more signals from the controller 340, a CPLD, or both.

At step 425, an image of the second field of view is captured. For example, the controller 340 may cause the imager 320 to capture a single image or capture multiple images at an image capture rate (e.g., 60 fps). By way of another example, the imager 320 may already be capturing images at the image capture rate and the image captured at step 425 is the next image captured at the image capture rate or the previous image captured at the image capture rate. Because the LEDs 371 and 372 illuminate the field of view 310 at the same time or approximately the same time as the imager 320 captures an image, the captured image should include objects (e.g., optical codes) within the field of view 310, but not the field of view 305. Accordingly, the field of view 305 should be dark relative to the field of view 310 because LEDs 381 and 382 do not illuminate the field of view 305 at same time as LEDs 371 and 372 illuminate the field of view 310. Thus, an image is readily decodable when the field of view 305 includes illumination (e.g., ambient light) that is approximately 1/10th of the illumination included in the field of view 310 (e.g., LED illumination).

At step 430, the image captured at step 425 is processed to determine whether the captured image contains decodable data corresponding to one or more optical codes. Any suitable technique may be used to identify decodable data. For example, pixel data corresponding to one or more sub-regions (e.g., virtual scan lines) of the captured image may be processed to locate edge transitions and to attempt to decode the captured image based on the edge transition locations (e.g., using a low level decoder, a high level decoder, or both). By way of another example, a two-dimensional decoding algorithm may be used to determine whether the captured image contains decodable data corresponding to an optical code. Any suitable two-dimensional decoding algorithm may be used. According to one embodiment, the captured image is not decoded at step 430. For example, the captured image may be processed to determine whether the captured image contains or is likely to contain decodable data, such as when the relative locations of edge transitions and spaces there between yield at least one valid character, codeword, or overhead character, or when a minimum number of edge transitions are detected. If the captured image contains or is likely to contain decodable data, the captured image may be stored in a memory (e.g., memory 170 or 182 in FIG. 1) for later processing and decoding. According to another embodiment, the captured image is decoded at step 430 using a suitable decoder (e.g., decoder(s) 230 in FIG. 2). Additionally, steps 430 and 415 may be performed in parallel (i.e., concurrently, or contemporaneously) in some embodiments.

At step 440, a determination is made as to whether to repeat steps 405 through 430. For example, if one or more optical codes is detected and/or decoded at steps 415, 430, or both, the method 400 may terminate. By way of another example, the method 400 may terminate if no optical codes are detected and/or decoded at steps 415, 430, or both, within a predetermined period of time. By way of still another example, steps 405 through 430 may automatically be repeated until an optical code is detected and/or decoded at steps 415, 430, or both. Step 440 may be omitted in certain embodiments. For example, the method 400 may automatically end after 430 or the method 400 may automatically repeat steps 405 through 430 one or more times. In certain embodiments, the number of times steps 405 through 430 are repeated is programmable by the user.

The steps 405 and 410, the steps 420 and 425, or the steps 405, 410, 420 and 425, may be initiated or performed in response to a trigger. The trigger may comprise any number of events, such as the actuation of a trigger button or switch (e.g., the user manually depresses a trigger button or switch, which may be disposed on a housing of the data reader), receiving a command from a host computer (e.g., the host 250 in FIG. 2) or device, or decoding data associated with a special optical code, such as pick list labels (e.g., the operator may scan a particular optical code (e.g., optical code associated with an apple) from a list of optical codes (e.g., a list of optical codes associated with various fruit)). The trigger may be object dependent, time dependent, or both object and time dependent. For example, the object trigger may comprise the presence of an object within the scan volume or the detection of an object in the scan volume. By way of another example, the object trigger may be caused by the presence of an object within the scan volume for a predetermined duration, such as a predetermined number of image frames or a predetermined period of time.

The steps 405 through 430 may be performed in any order or in parallel (e.g., at the same time). Moreover, one or more of the steps 405 through 430 may be omitted and/or replaced with other steps. For example, the method 400 may omit steps 405, 420, or both (e.g., the data reader 300 may rely on ambient light instead of illuminating the first and second fields of view). The method 400 may include additional steps according to other embodiments. For example, if the data reader 300 includes more than two fields of view, steps similar to those described with reference to steps 405 through 415 or steps 420 through 430 may be included for each of the additional fields of view. In other words, if the data reader includes three fields of view, the method 300 may include additional steps to illuminate the third field of view, capture an image of the third field of view, and decode the image capture of the third field of view. By way of another example, the data reader 300 may be configured to capture more than one image of the first field of view before capturing an image of the second field of view. Similarly, the data reader 300 may be configured to capture more than one image of the second field of view before capturing another image of the first field of view. Thus, steps 405, 410, and 415 may be repeated one or more times before proceeding to steps 420, 425, and 430. Similarly, steps 420, 425, and 430 may be repeated one or more times before proceeding to steps 405, 410, and 415.

Figure 5:
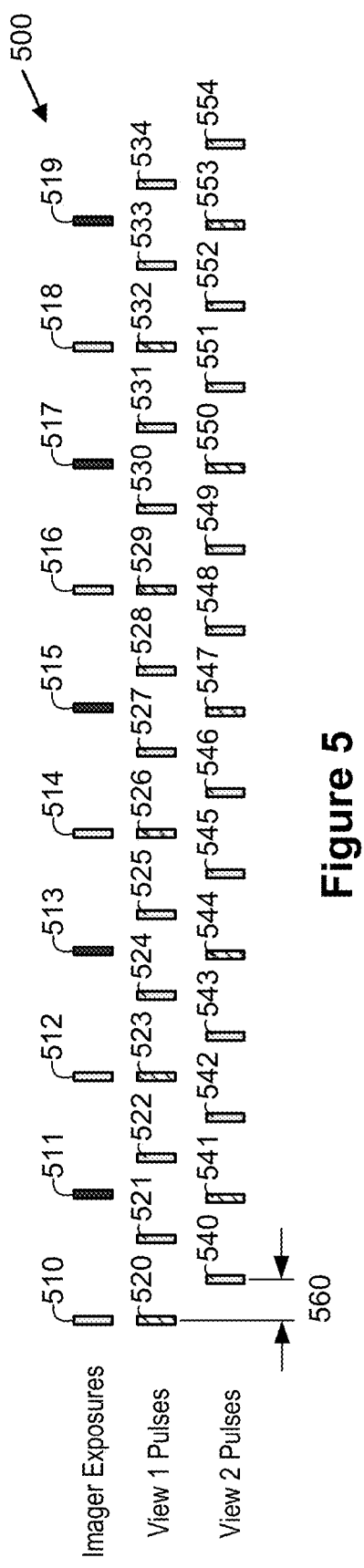

Referring now to FIG. 5, a timing diagram 500 according to one embodiment illustrates frame exposures 510-519 of an imager (e.g., the imager 320 in FIG. 3), optical pulses 520-534 emitted by an illumination source associated with a first field of view (e.g., optical pulses generated by the LEDs 381 and 382 associated with the field of view 305 in FIG. 3), and optical pulses 540-554 associated with a second field of view (e.g., optical pulses generated by the LEDs 371 and 372 associated with the field of view 310 in FIG. 3). With reference to FIGS. 3 and 5, the LEDs 381 and 382 are pulsed at a frequency approximately equal to 1.5 times the image capture rate so that every third optical pulse coincides with every other frame exposure. In other words, the frequency of the optical pulses 520-534 and the image capture rate of the frame exposures 510-519 are set such that the optical pulses 520, 523, 526, 529, and 532 coincide with the frame exposures 510, 512, 514, 516, and 518, respectively. According to one embodiment, optical pulses 520-534 have a pulse width of approximately 125 µs and are emitted at a frequency of approximately 90 Hz so that an imaged optical pulse (i.e., optical pulses 520, 523, 526, 529, and 532) coincides with every other frame exposure of the imager 320, which is set to expose 60 fps (60 Hz). As a result, optical pulses 521, 522, 524, 525, 527, 528, 530, 531, 533, and 534 do not coincide with any of the frame exposures 510-519. In some embodiments, the pulse width may be in a range from approximately 0 µs to 1000 µs, may be emitted at any frequency greater than approximately 50 Hz for visible light or any frequency for invisible (e.g., infrared) light, and the exposure times of the imager may be approximately the same as the range of LED pulse widths.

In a similar vein, the LEDs 371 and 372 are pulsed at a frequency approximately equal to 1.5 times the image capture rate so that every third optical pulse coincides with every other frame exposure. In other words, the frequency of the optical pulses 540-554 and the image capture rate of the frame exposures 510-519 are set such that the optical pulses 541, 544, 547, 550, and 553 coincide with the frame exposures

511, 513, 515, 517, and 519, respectively. According to one embodiment, optical pulses 540-554 have a pulse width of approximately 125 μs (or a range from 0 μs to 1000 μs, as discussed above) and are emitted at a frequency of approximately 90 Hz so that an imaged optical pulse (i.e., optical pulses 541, 544, 547, 550, and 553) coincides with every other frame exposure of the imager 320, which is set to expose 60 fps (60 Hz). As a result, optical pulses 540, 542, 543, 545, 546, 548, 549, 551, 552, and 554 do not coincide with any of the frame exposures 510-519. Thus, the frame exposures 510, 512, 514, 516, and 518 capture images of the field of view 305 while the frame exposures 511, 513, 515, 517, and 519 capture images of the field of view 310.

As illustrated in FIG. 5, there is an offset 560 between the optical pulses 520-534 and the optical pulses 540-554. According to one embodiment, the offset 560 is set to approximately half of the frequency of the optical pulses 520-534 and 540-554 (assuming the frequency of the frequency of the optical pulses 520-534 and 540-554 are approximately equal). Thus, if the pulse repetition rate of the optical pulses 520-534 and 540-554 is approximately 90 Hz, the offset 560 is approximately 5.55 milliseconds. According to other embodiments, the optical pulses 520-534 and 540-554 are emitted at a frequency other than 90 Hz, such as between approximately 30 Hz and 210 Hz, and the offset 560 is between approximately the LED pulse width and 11 milliseconds; however, the offset 560 may vary depending on LED pulse width and exposure duration time. In any event, frame exposures are timed to coincide with alternating view 1 and view 2 pulses that do not overlap in order to avoid exposures that include illumination from both view 1 and view 2 during the same exposure period. According to a preferred embodiment, the optical pulses 520-534 and 540-554 are emitted at a frequency sufficient to prevent a flashing sensation by most users (typically 50-60 Hz or greater). If, however, the optical pulses 520-534 and 540-554 are not within the visible spectrum (e.g., if the LEDs 371, 372, 381, and 382 emit infrared radiation) and will not impart a flashing sensation, the optical pulses 520-534 and 540-554 may be pulsed at a rate slower than 50-60 Hz.

The optical pulses 520-534 and 540-554 may be timed by a processor or controller (e.g., controllers 140 and 340), a CPLD or FPGA (FIG. 12), an imager (e.g., the imager 110 and 320), or any combination thereof. For example, the timing of the frame exposures 510-519 and the optical pulses 520-534 and 540-554 may be set by control signals output from the controller 340. By way of another example, the timing of the optical pulses 520-534 and 540-554 may be synchronized by synchronization signals output from the imager 320 to help ensure that the optical pulses 520, 541, 523, 544, 526, 547, 529, 550, 532, and 553 coincide with the frame exposures 510-519, respectively.

Figure 6:
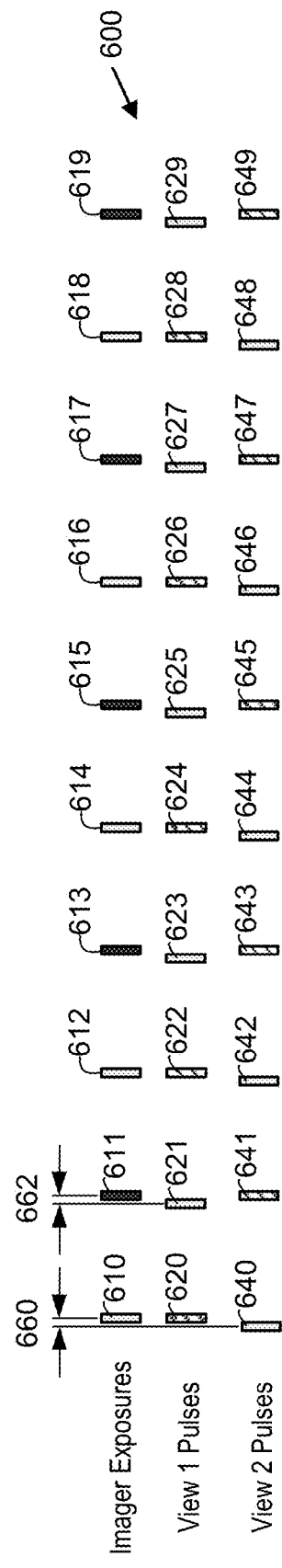

Referring now to FIG. 6, a timing diagram 600 according to one embodiment illustrates frame exposures 610-619 of an imager (e.g., the imager 320 in FIG. 3), optical pulses 620-629 emitted by an illumination source associated with a first field of view (e.g., optical pulses generated by the LEDs 381 and 382 associated with the field of view 305 in FIG. 3), and optical pulses 640-649 associated with a second field of view (e.g., optical pulses generated by the LEDs 371 and 372 associated with the field of view 310 in FIG. 3). With reference to FIGS. 3 and 6, the LEDs 381 and 382 are pulsed at approximately the same frequency as the image capture rate of the imager 320 and every other optical pulse is offset or shifted so that every other optical pulse coincides with every other frame exposure. In other words, the frequency of the optical pulses 620-629 and the image capture rate of the frame exposures 610-619 are set such that the optical pulses 620, 622, 624, 626, and 628 coincide with the frame exposures 610, 612, 614, 616, and 618, respectively, and the optical pulses 621, 623, 625, 627, and 629 are offset or shifted by a predetermined amount of time so that the optical pulses 621, 623, 625, 627, and 629 do not coincide with the frame exposures 611, 613, 615, 617, and 619, respectively. According to one embodiment, optical pulses 620-629 have a pulse width of approximately 125 μs and are emitted at a frequency of approximately 60 Hz and every other optical pulse is shifted by a predetermined amount of time so that an imaged optical pulse (i.e., optical pulses 620, 622, 624, 626, and 628) coincides with every other frame exposure of the imager 320, which is set to expose 60 fps (60 Hz). As a result, offset optical pulses 621, 623, 625, 627, and 629 do not coincide with any of the frame exposures 610-619. In some embodiments, the pulse width may be in a range from approximately 0 μs to 1000 μs, may be emitted at any frequency greater than approximately 50 Hz for visible light or any frequency for invisible (e.g., infrared) light, and the exposure times of the imager may be approximately the same as the range of LED pulse widths.

In a similar vein, the LEDs 371 and 372 are pulsed at approximately the same frequency as the image capture rate of the imager 320 and every other optical pulse is offset or shifted so that every other optical pulse coincides with every other frame exposure. In other words, the frequency of the optical pulses 640-649 and the image capture rate of the frame exposures 610-619 are set such that the optical pulses 641, 643, 645, 647, and 649 coincide with the frame exposures 611, 613, 615, 617, and 619, respectively, and the optical pulses 640, 642, 644, 646, and 648 are offset or shifted by a predetermined amount of time so that the optical pulses 640, 642, 644, 646, and 648 do not coincide with the frame exposures 610, 612, 614, 616, and 618, respectively. According to one embodiment, optical pulses 640-649 have a pulse width of approximately 125 μs (or a range from 0 μs to 1000 μs, as discussed above) and are emitted at a frequency of approximately 60 Hz and every other optical pulse is shifted by a predetermined amount of time so that an imaged optical pulse (i.e., optical pulses 641, 643, 645, 647, and 649) coincides with every other frame exposure of the imager 320, which is set to expose 60 fps (60 Hz). As a result, offset optical pulses 640, 642, 644, 646, and 648 do not coincide with any of the frame exposures 610-619.

As illustrated in FIG. 6, the optical pulses 621, 623, 625, 627, and 629 illuminate the field of view 305 (FIG. 3) slightly before the imager 320 captures an image at respective frame exposures 611, 613, 615, 617, and 619. Thus, when the optical pulses 641, 643, 645, 647, and 649 illuminate the field of view 310, the imager 320 captures an image of the field of view 310 (not the field of view 305) at respective frame exposures 611, 613, 615, 617, and 619. Likewise, the optical pulses 640, 642, 644, 646, and 648 illuminate the field of view 310 slightly before the imager 320 captures an image at respective frame exposures 610, 612, 614, 616, and 618. Thus, when the optical pulses 620, 622, 624, 626, and 628 illuminate the field of view 305, the imager 320 captures an image of the field of view 305 (not the field of view 310) at respective frame exposures 610, 612, 614, 616, and 618. FIG. 6 illustrates an offset 660 between the frame exposure 610 and the optical pulse 640 and an offset 662 between the frame exposure 611 and the optical pulse 621. The offsets 660 and 662 are preferably greater than or equal to the pulse width of the optical pulses used to illuminate the other field(s) of view. According to one embodiment, the offsets 660 and 662 are set such that, for example, there is no overlap between frame exposure 610 and LED pulse 640 (view 2), and complete overlap between frame exposure 610 and LED pulse 620 (view 1), while in the next frame exposure 611 there is no overlap with view 1 and complete overlap with view 2. Thus, the frame exposure timing remains consistent while the LED pulse timing is staggered to produce alternating exposures. The staggered LED pulse timing lowers the LED pulse frequency and reduces the LED brightness shining on a user, but the imager 320 still receives complete illumination from the LEDs during each frame exposure. In other words, the LEDs 381 and 382 illuminate the field of view 305 approximately 125 µs before an image is captured at the frame exposure 611 and the LEDs 371 and 372 illuminate the field of view 310 approximately 125 µs before an image is captured at the frame exposure 610. The offset may be fixed or the offset may vary. For example, the offset for the optical pulse 621 may be 125 µs while the offset for the optical pulse 623 may be greater or less than 125 µs. Moreover, while the optical pulses 621 and 640 occur slightly before the frame exposures 611 and 610, respectively, the optical pulse 621 may occur slightly after the frame exposure 611 and the optical pulse 641 and the optical pulse 640 may occur slightly after the frame exposure 610 and the optical pulse 620. The offsets 660 and 662 may be initiated by a processor or controller (e.g., controllers 140 and 340), a CPLD (FIG. 12), or both. Moreover, while the offsets 660 and 662 may be initiated by software, the offsets 660 and 662 may be hardware controlled or hardware and software controlled.

The optical pulses 620-629 and 640-649 may be timed by a processor or controller (e.g., controllers 140 and 340), a CPLD (FIG. 12), an imager (e.g., the imager 110 and 320), or any combination thereof. For example, the timing of the frame exposures 610-619 and the optical pulses 620-629 and 640-649 may be set by control signals output by the controller 340. By way of another example, the timing of the optical pulses 620-629 and 640-649 may be synchronized by synchronization signals output by the imager 320 to help ensure that the optical pulses 620, 641, 622, 643, 624, 645, 626, 647, 628, and 649 coincide with the frame exposures 610-619, respectively.

Referring now to FIGS. 5 and 6, if the optical pulses 520-534 and 540-554 are emitted at a frequency of approximately 90 Hz and the optical pulses 620-629 and 640-649 are emitted at a frequency of approximately 60 Hz, the illumination provided by the optical pulses 520-534 and 540-554 would appear brighter than the illumination provided by the optical pulses 620-629 and 640-649. Even though the optical pulses 520-534 and 540-554 are emitted at a frequency of approximately 90 Hz and the optical pulses 620-629 and 640-649 are emitted at a frequency of approximately 60 Hz, the data reader 300 should have approximately the same depth of field of between approximately 4 inches and between approximately 12 inches (depending on the data reader design) regardless of whether the data reader is configured to implement the optical pulses 520-534 and 540-554 or the optical pulses 620-629 and 640-649.

Referring now to FIG. 7, a timing diagram 700 according to one embodiment illustrates frame exposures 710-719 of an imager (e.g., the imager 320 in FIG. 3), optical pulses 620-629 emitted by an illumination source associated with a first field of view (e.g., optical pulses generated by the LEDs 381 and 382 associated with the field of view 305 in FIG. 3), and optical pulses 640-649 associated with a second field of view (e.g., optical pulses generated by the LEDs 371 and 372 associated with the field of view 310 in FIG. 3). The timing diagram 700 substantially mirrors the timing diagram 600, except the frame exposures 711, 713, 715, 717, and 719 are longer relative to the frame exposures 710, 712, 714, 716, and 718. The longer exposure times may help capture optical codes under certain reading conditions. For example, the longer exposure times may be particularly well suited for capturing and decoding images of optical codes displayed using a display device of a mobile device, such as a cellular telephone, smart phone, or personal digital assistant. By way of another example, the longer exposure times may be helpful if the illumination source for the second field of view is reduced or omitted (e.g., if images captured of the second field of view are captured using ambient light). According to one embodiment, the imager 320 is set to expose 60 fps (60 Hz), with the frame exposures 710, 712, 714, 716, and 718 having a duration of approximately 125 µs and the frame exposures 711, 713, 715, 717, and 719 having a duration of approximately 1000 µs.

Referring now to FIG. 8, a timing diagram 800 according to one embodiment illustrates frame exposures 810-819 of an imager (e.g., the imager 320 in FIG. 3), optical pulses 820-829 emitted by an illumination source associated with a first field of view (e.g., optical pulses generated by the LEDs 381 and 382 associated with the field of view 305 in FIG. 3), and optical pulses 840-849 associated with a second field of view (e.g., optical pulses generated by the LEDs 371 and 372 associated with the field of view 310 in FIG. 3). The timing diagram 800 illustrates an example of capturing in an alternating fashion two images of the first field of view and one image from the second field of view. In contrast, timing diagrams 500 (FIG. 5), 600 (FIG. 6), and 700 (FIG. 7) illustrate examples of capturing in an alternating fashion one image of the first field of view and one image from the second field of view. If the imager 320 (FIG. 3) is set to expose 60 fps (60 Hz) in timing diagrams 500, 600, and 700, the imager 320 will capture approximately 30 fps for the field of view 305 and approximately 30 fps for the field of view 310. In contrast, if the imager 320 (FIG. 3) is set to expose 60 fps (60 Hz) in timing diagram 800, the imager 320 will capture approximately 40 fps for the field of view 305 and approximately 20 fps for the field of view 310.

With reference to FIGS. 3 and 8, the LEDs 381 and 382 are pulsed at approximately the same frequency as the image capture rate of the imager 320 and every third optical pulse is offset or shifted so that two out of three optical pulses coincide with two out of three frame exposures. In other words, the frequency of the optical pulses 820-829 and the image capture rate of the frame exposures 810-819 are set such that the optical pulses 820, 821, 823, 824, 826, 827, and 829 coincide with the frame exposures 810, 811, 813, 814, 816, 817, and 819, respectively, and the optical pulses 822, 825, and 828 are offset or shifted by a predetermined amount of time so that the optical pulses 822, 825, and 828 do not coincide with the frame exposures 812, 815, and 818, respectively. According to one embodiment, optical pulses 820-829 have a pulse width of approximately 125 µs and are emitted at a frequency of approximately 60 Hz and every third optical pulse is shifted by a predetermined amount of time so that an imaged optical pulse (i.e., optical pulses 820, 821, 823, 824, 826, 827, and 829) coincides with two out of three frame exposures of the imager 320, which is set to expose 60 fps (60 Hz). As a result, offset optical pulses 822, 825, and 828 do not coincide with any of the frame exposures 810-819. In some embodiments, the pulse width may be in a range from approximately 0 µs to 1000 µs, may be emitted at any frequency greater than approximately 50 Hz for visible light or any frequency for invisible (e.g., infrared) light, and the exposure times of the imager may be approximately the same as the range of LED pulse widths.

In a similar vein, the LEDs 371 and 372 are pulsed at approximately the same frequency as the image capture rate of the imager 320 and two out of three optical pulses are offset or shifted so that every third optical pulse coincides with every third frame exposure. In other words, the frequency of the optical pulses 840-849 and the image capture rate of the frame exposures 810-819 are set such that the optical pulses 842, 845, and 848 coincide with the frame exposures 812, 815, and 818, respectively, and the optical pulses 840, 841, 843, 844, 846, 847, and 849 are offset or shifted by a predetermined amount of time so that the optical pulses 840, 841, 843, 844, 846, 847, and 849 do not coincide with the frame exposures 810, 811, 813, 814, 816, 817, and 819, respectively. According to one embodiment, optical pulses 840-849 have a pulse width of approximately 125 µs (or a range from 0 µs to 1000 µs, as discussed above) and are emitted at a frequency of approximately 60 Hz and two out of three optical pulses are shifted by a predetermined amount of time so that an imaged optical pulse (i.e., optical pulses 842, 845, and 848) coincides with every third frame exposure of the imager 320, which is set to expose 60 fps (60 Hz). As a result, offset optical pulses 840, 841, 843, 844, 846, 847, and 849 do not coincide with any of the frame exposures 810-819.

As illustrated in FIG. 8, the optical pulses 822, 825, and 828 illuminate the field of view 305 (FIG. 3) slightly after the imager 320 captures an image at respective frame exposures 812, 815, and 818. Thus, when the optical pulses 842, 845, and 848 illuminate the field of view 310, the imager 320 captures an image of the field of view 310 (not the field of view 305) at respective frame exposures 812, 815, and 818. In a similar vein, the optical pulses 840, 841, 843, 844, 846, 847, and 849 illuminate the field of view 310 slightly after the imager 320 captures an image at respective frame exposures 810, 811, 813, 814, 816, 817, and 819. Thus, when the optical pulses 820, 821, 823, 824, 826, 827, and 829 illuminate the field of view 305, the imager 320 captures an image of the field of view 305 (not the field of view 310) at respective frame exposures 810, 811, 813, 814, 816, 817, and 819. FIG. 8 illustrates an offset 860 between the frame exposure 810 and the optical pulse 840, an offset 862 between the frame exposure 811 and the optical pulse 841, and an offset 864 between the frame exposure 812 and the optical pulse 822. The offsets 860, 862, and 864 are preferably greater than or equal to the pulse width of the optical pulses used to illuminate the other field(s) of view. According to one embodiment, the offsets 860, 862, and 864 are set between approximately 0 µs and approximately 1000 µs, and preferably approximately 125 µs. In other words, the LEDs 381 and 382 illuminate the field of view 305 approximately 125 µs after an image is captured at the frame exposure 812. Similarly, the LEDs 371 and 372 illuminate the field of view 310 approximately 125 µs after an image is captured at the frame exposures 810 and 811. The offset may be fixed or the offset may vary. For example, the offset for the optical pulse 822 may be 125 µs while the offset for the optical pulse 825 may be greater or less than 125 µs. Moreover, while the optical pulse 822 occurs slightly after the frame exposure 812, the optical pulse 822 may occur slightly before the frame exposure 812 and the optical pulse 842. Similarly, while the optical pulses 840 and 841 occur slightly after the frame exposures 810 and 811, respectively, the optical pulses 840 and 841 may occur slightly before the frame exposures 810 and 811. The offsets 860, 862, and 864 may be initiated by a processor or controller (e.g., controllers 140 and 340), a CPLD (FIG. 11), or both. Moreover, while the offsets 860, 862, and 864 may be initiated by software, the offsets 860, 862, and 864 may be hardware controlled or hardware and software controlled.

The optical pulses 820-829 and 840-849 may be timed by a processor or controller (e.g., controllers 140 and 340), a CPLD (FIG. 11), an imager (e.g., the imager 110 and 320), or any combination thereof. For example, the timing of the frame exposures 810-819 and the optical pulses 820-829 and 840-849 may be set by control signals output by the controller 340. By way of another example, the timing of the optical pulses 820-829 and 840-849 may be synchronized by synchronization signals output by the imager 320 to help ensure that the optical pulses 820, 821, 842, 823, 824, 845, 826, 827, 848, and 829 coincide with the frame exposures 810-819, respectively.

Referring now to FIG. 9, a timing diagram 900 according to one embodiment illustrates frame exposures 910-919 of an imager (e.g., the imager 320 in FIG. 3), optical pulses 920-929 emitted by an illumination source associated with a first field of view (e.g., optical pulses generated by the LEDs 381 and 382 associated with the field of view 305 in FIG. 3), and optical pulses 940-949 associated with a second field of view (e.g., optical pulses generated by the LEDs 371 and 372 associated with the field of view 310 in FIG. 3). The timing diagram 900 substantially mirrors the timing diagram 800, except the timing diagram 900 illustrates offsetting or shifting frame exposures in lieu of offsetting or shifting the optical pulses.

With reference to FIGS. 3 and 9, the LEDs 381 and 382 are pulsed at approximately the same frequency as the image capture rate of the imager 320 and every third frame exposure is offset or shifted so that two out of three optical pulses coincide with two out of three frame exposures. In other words, the frequency of the optical pulses 920-929 and the image capture rate of the frame exposures 910-919 are set such that the optical pulses 920, 921, 923, 924, 926, 927, and 929 coincide with the frame exposures 910, 911, 913, 914, 916, 917, and 919, respectively, and the frame exposures 912, 915, and 918 are offset or shifted by a predetermined amount of time so that the optical pulses 922, 925, and 928 do not coincide with the frame exposures 912, 915, and 918, respectively. According to one embodiment, optical pulses 920-929 have a pulse width of approximately 125 µs and are emitted at a frequency of approximately 60 Hz and every third frame exposure is shifted by a predetermined amount of time so that an imaged optical pulse (i.e., optical pulses 920, 921, 923, 924, 926, 927, and 929) coincides with two out of three frame exposures of the imager 320, which is set to expose 60 fps (60 Hz). As a result, offset frame exposures 912, 915, and 918 do not coincide with the optical pulses 922, 925, and 928. In some embodiments, the pulse width may be in a range from approximately 0 µs to 1000 µs, may be emitted at any frequency greater than approximately 50 Hz for visible light or any frequency for invisible (e.g., infrared) light, and the exposure times of the imager may be approximately the same as the range of LED pulse widths.

In a similar vein, the LEDs 371 and 372 are pulsed at approximately the same frequency as the image capture rate of the imager 320. According to one embodiment, optical pulses 940-949 have a pulse width of approximately 125 µs (or a range from 0 µs to 1000 µs, as discussed above) and are emitted at a frequency of approximately 60 Hz. As illustrated in FIG. 9, there is an offset 960 between the optical pulses 920-929 and the optical pulses 940-949. Because every third frame exposure (i.e., the frame exposures 912, 915, and 918) is offset or shifted by a predetermined amount of time and the optical pulses 920-929 do not coincide with the optical pulses 940-949 due to the offset 960, the optical pulses 920-929 and 940-949 do not need to be offset or shifted themselves to prevent both fields of view 305 and 310 from being illuminated at the same time as the imager 320 captures an image. The offset 960 is preferably set to be greater than the pulse width of the optical pulses 920-929 and 940-949. According to one embodiment, the offset 960 is set between approximately the LED pulse width and approximately 16666 µs, and preferably approximately 125 µs.

Offsetting or shifting every third frame exposure (i.e., the frame exposures 912, 915, and 918) by a predetermined amount of time causes the imager 320 to capture an image at frame exposures 912, 915, and 918 slightly after the respective optical pulses 922, 925, and 928 illuminate the field of view 305 (FIG. 3). Thus, when the optical pulses 942, 945, and 948 illuminate the field of view 310, the imager 320 captures an image of the field of view 310 (not the field of view 305) at respective frame exposures 912, 915, and 918. In a similar vein, due to the offset 960 between the optical pulses 920-929 and 940-949, the optical pulses 940, 941, 943, 944, 946, 947, and 949 illuminate the field of view 310 slightly after the imager 320 captures an image at respective frame exposures 910, 911, 913, 914, 916, 917, and 919. Thus, when the optical pulses 920, 921, 923, 924, 926, 927, and 929 illuminate the field of view 305, the imager 320 captures an image of the field of view 305 (not the field of view 310) at respective frame exposures 910, 911, 913, 914, 916, 917, and 919.

FIG. 9 illustrates an offset 962 between the frame exposure 912 and the optical pulse 922. The offset 962 is preferably greater than or equal to the pulse width of the optical pulses used to illuminate the other field(s) of view. According to one embodiment, the offset 962 is set between approximately the LED pulse width and approximately 16666 µs, and preferably approximately 125 µs. In other words, the LEDs 381 and 382 illuminate the field of view 305 approximately 125 µs before an image is captured at the frame exposure 912. If the image capture rate of the frame exposures 910-919 is approximately 60 Hz, the time 970 between frame exposures 910 and 913 is approximately 50,000.1 µs and the time 970 between frame exposures 910 and 911 is approximately 16,666.7 µs. If the offset 962 is set to approximately 125 µs (e.g., the pulse width of the optical pulse 922), the time 974 between frame exposures 911 and 912 is approximately 16,791.7 µs and the time 976 between frame exposures 912 and 913 is approximately 16,541.7 µs. The offset 962 may be fixed or the offset 962 may vary. For example, the offset for the frame exposure 912 may be 125 µs while the offset for the frame exposure 915 may be greater or less than 125 µs. Moreover, while the frame exposure 912 occurs slightly after the optical pulse 922, the frame exposure 912 may occur slightly before the optical pulse 922 (e.g., if the optical pulse 942 were also offset or shifted to coincide with the frame exposure 912). The offset 962 may be initiated by a processor or controller (e.g., controllers 140 and 340), a CPLD, or both. Moreover, while the offset 962 may be initiated by software, the offset 962 may be hardware controlled or hardware and software controlled.

The optical pulses 920-929 and 940-949 may be timed by a processor or controller (e.g., controllers 140 and 340), a CPLD (FIG. 11), an imager (e.g., the imager 110 and 320), or any combination thereof. For example, the timing of the frame exposures 910-919 and the optical pulses 920-929 and 940-949 may be set by control signals output by the controller 340. By way of another example, the timing of the optical pulses 920-929 and 940-949 may be synchronized by synchronization signals output by the imager 320 to help ensure that the optical pulses 920, 921, 942, 923, 924, 945, 926, 927, 948, and 929 coincide with the frame exposures 910-919, respectively.

Figure 20:
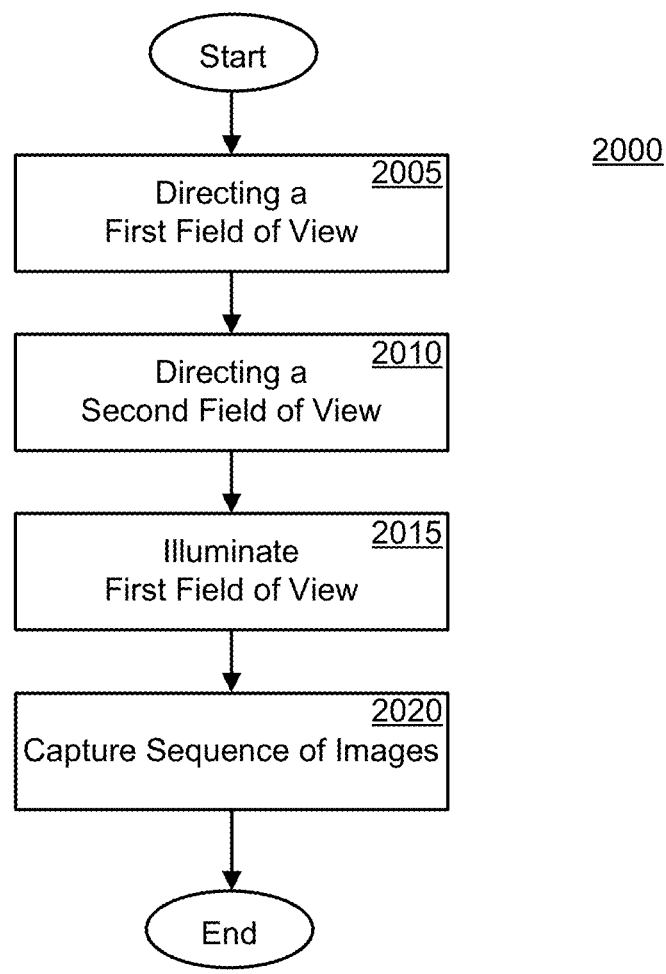
FIG. 20 is a flow chart of a method for generating image data using a data reader having multiple fields of view, according to another embodiment.

FIG. 20 shows a method 2000 for generating image data using a data reader, such as the data reader 300, according to one embodiment. Step 2005 includes directing a first field of view of the imager along a first path. For example, the lens assembly 330, beam splitter 350, and optional mirrors positioned along the first path 332 direct light from the first field of view 305 to the imager 320.

Step 2010 includes directing a second field of view of the imager along a second path. For example, the lens assembly 330, beam splitter 350, and optional mirrors positioned along the second path 334 direct light from the second field of view 310 to the imager 320. In some embodiments, light received from the first and second fields of view 305 and 310 is combined at the beam splitter 350 so that the first and second paths 332 and 334 include intersecting or common portions that are incident on overlapping portions of the imager 320. The order of steps 2005 and 2010 is irrelevant.

Step 2015 includes illuminating, via a first illumination source, a first field of view of a data reader with a first series of illumination pulses at a first pulse repetition rate. For example, the step 2015 may be similar to step 405, discussed previously, and illumination is produced according to the timing of pulses 520-534, 620-629, 820-829, 920-929, or according to other timing pulses.

Step 2020 includes capturing at an imager (e.g., the imager 320), a sequence of images at an image capture rate. The image capture rate may be established according to image-capture timing of pulses 510-519, 610-619, 710-719, 810-819, 910-919, or according to other timing pulses.

The sequence of images are captured in an alternating manner with a first set of images of a first field of view and a second set of images of a second field of view. For example, similar to step 410 described previously, the first pulse repetition rate and the image capture rate are staggered, offset, or otherwise partly asynchronous so that the imager 320 captures the first set of images while a first illumination source (e.g., the LEDs 381 and 382) illuminates the first field of view 305 with an illumination pulse.

In one embodiment, alternating means that a first image is captured of the first field of view 305, followed by a second image captured of the second field of view 310, followed by a third image capture of the first field of view 305 (or of a third field of view), and so forth. In other embodiments, alternating means that two or more images are captured of one field of view, and then followed by an image captured of another field of view. For example, the data reader 300 may be configured to capture more than one image of the first field of view 305 before capturing an image of the second field of view 310. Furthermore, steps 2015 and 2020 may be repeated one or more times.

In some embodiments, the imager 320 captures the second set of images while a second illumination source (e.g., the LEDs 371 and 372) illuminates the second field of view 310 with an illumination pulse, or ambient light may be used to illuminate the second field of view 310 for capturing the second set of images.

Figure 10:
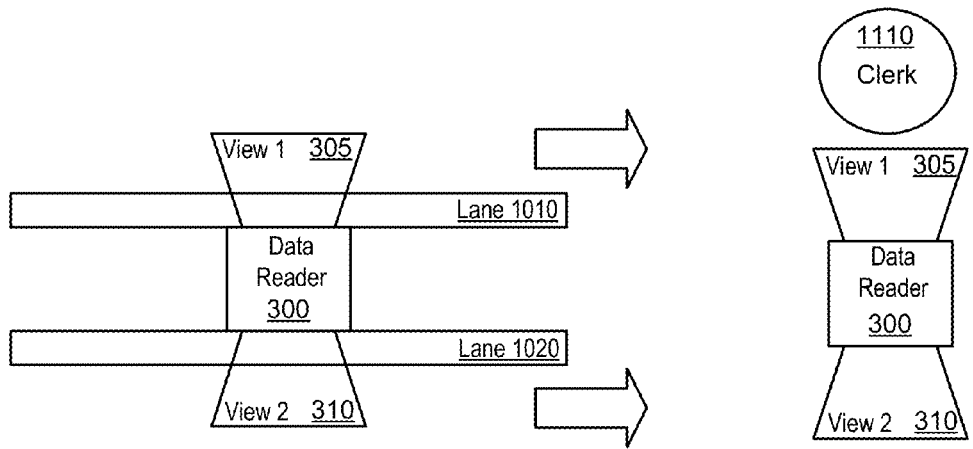
FIG. 10 is a schematic diagram illustrating an application of the data reader in FIG. 3, according to one embodiment.

Referring now to FIG. 10, an application of the data reader 300 in FIG. 3 is illustrated according to one embodiment. The data reader 300, which is similar to the data reader 100 described with reference to FIG. 1, is illustrated in a back-to-back configuration. The field of view 305 is dedicated to reading (e.g., detecting and decoding) optical codes that appear on objects (e.g., merchandise or packages) moving along lane 1010 and the field of view 310 is dedicated to reading (e.g., detecting and decoding) optical codes that appear on objects (e.g., merchandise or packages) moving along lane 1020. The lanes 1010 and 1020 may comprise checkout lanes at a point of sale or conveyor belts at a package sorting facility (e.g., sorting packages or other objects at a shipping facility, manufacturing plant, or warehouse, or sorting luggage at an airport). The data reader 300 may implement any of the timing diagrams described with reference to FIGS. 5-9.

Figure 11:
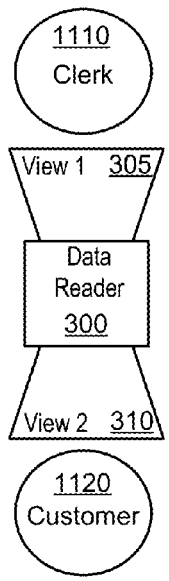
FIG. 11 is a schematic diagram illustrating an application of the data reader in FIG. 3, according to another embodiment.

Referring now to FIG. 11, an application of the data reader 300 in FIG. 3 is illustrated according to another embodiment. The data reader 300, which is similar to the data reader 100 described with reference to FIG. 1, is illustrated in a back-to-back configuration. The field of view 305 is dedicated to reading (e.g., detecting and decoding) optical codes that appear on objects (e.g., merchandise or packages) presented by a merchant-clerk 1110 on a merchant-clerk side of the data reader 300. The field of view 310 is dedicated to reading (e.g., detecting and decoding) optical codes that appear on objects (e.g., merchandise or packages) presented by a customer 1120 on a customer side of the data reader 300. For example, the merchant-clerk 1110 may be scanning merchandise that the customer 1120 wants to purchase while the customer 1120 is scanning their coupons or loyalty reward card. If the customer is scanning optical codes displayed on a portable device, such as a cell phone or smart phone, the data reader 300 may implement the timing diagram 700 described with reference to FIG. 7. The long exposure times for the frame exposures 711, 713, 715, 717, and 719 may help the data reader 300 read optical codes presented via a display of a portable device. The LEDs 371 and 372 (FIG. 3), the mirror 360, or both, may be omitted in certain embodiments and the data reader 300 may capture images from field of view 310 using ambient light. If the data reader 300 is relying on ambient light to capture images from the field of view 310, the data reader 300 may implement the timing diagram 700 (FIG. 7) as the long exposure times for the frame exposures 711, 713, 715, 717, and 719 may help the data reader 300 read optical codes in ambient light conditions. According to one embodiment, the field of view 310 on the customer side of the data reader 300 faces down to minimize ambient light, such as illumination from ceiling lights. In certain embodiments, the data reader 300 implements the timing diagrams 800 or 900 described with reference to FIGS. 8 and 9 so that more images are captured from field of view 305 to help increase, for example, scanning throughput on the merchant-clerk side of the data reader 300. The data reader 300 may also implement the timing diagrams 500 and 600 described with reference to FIGS. 5 and 6.

Figure 12:
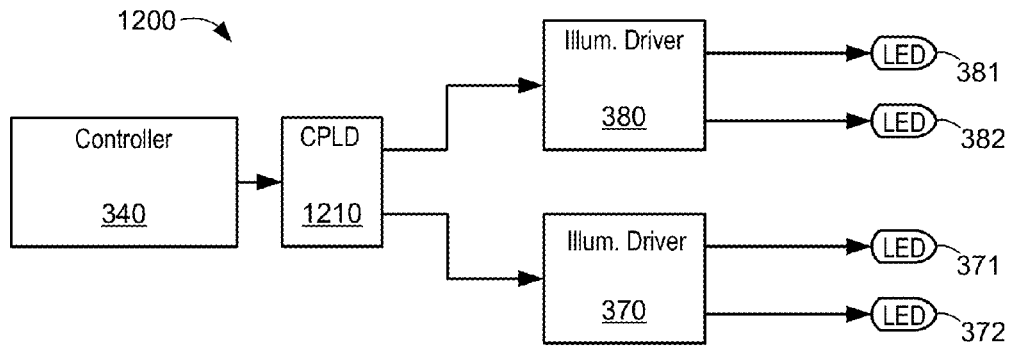
FIGS. 12-13 are block diagrams illustrating various components used to control illumination, according to various embodiments.

FIG. 12 is a block diagram illustrating an illumination control circuit 1200, according to one embodiment. The illumination control circuit 1200 includes the controller 340 (FIG. 3) in communication with a CPLD 1210 or other programmable logic device, such as an FPGA. The CPLD 1210 is configured to provide signals to the illumination drivers 370 and 380 to selectively illuminate the fields of view 305 and 310. The illumination driver 370, in turn, applies signals to the illumination LEDs 371 and 372 to strobe the LEDs 371 and 372 at desired times or to light the LEDs constantly for a period of time. Likewise, the illumination driver 380 applies signals to the illumination LEDs 381 and 382 to strobe the LEDs 381 and 382 at desired times or to light the LEDs constantly for a period of time. The CPLD 1210 helps ensure timely delivery of the signals to the illumination drivers 370 and 380 so that the optical pulses emitted by the LEDs 371, 372, 381, and 382 coincide with the proper frame exposures as described with reference to the timing diagrams 500-900 in FIGS. 5-9.

Figure 13:
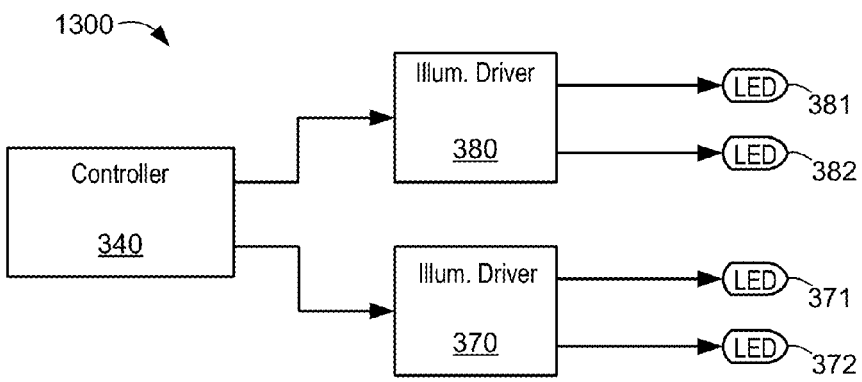
Figure 14:
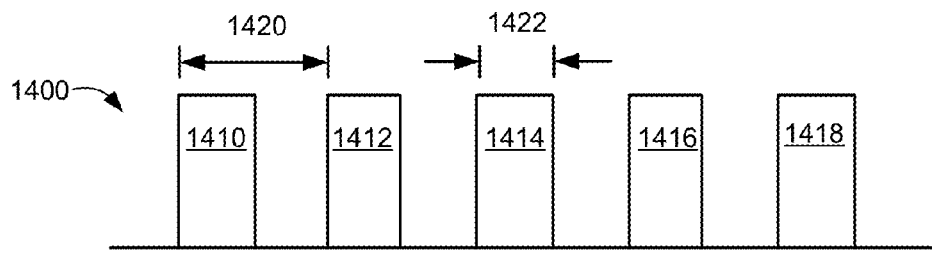
FIG. 14 illustrates an illumination-driving waveform, according to one embodiment.

FIG. 13 is a block diagram illustrating an illumination control circuit 1300, according to one embodiment. The illumination control circuit 1300 may be identical to that described with reference to FIG. 12, except the illumination control circuit 1300 omits the CPLD 1210. Instead, the illumination control circuit 1300 uses a general purpose I/O of the controller 340, a timer, or both, to provide signals to the illumination drivers 370 and 380 to selectively illuminate the fields of view 305 and 310. FIG. 14 illustrates an example illumination-driving waveform 1400 that may be output by the illumination driver 370 to drive the LEDs 371 and 372 and the illumination driver 380 to drive the LEDs 381 and 382. To generate the optical pulses described with reference to FIGS. 5-9, the illumination drivers 370 and 380 drive their illumination sources with a waveform that includes a series of electrical pulses. The illumination-driving waveform 1400 includes electrical pulses 1410, 1412, 1414, 1416, and 1418, each of which has a fixed pulse width 1422 that is generated at a predetermined period 1420. The height of each pulse corresponds to the drive current (e.g., LED drive current).

Figure 15:
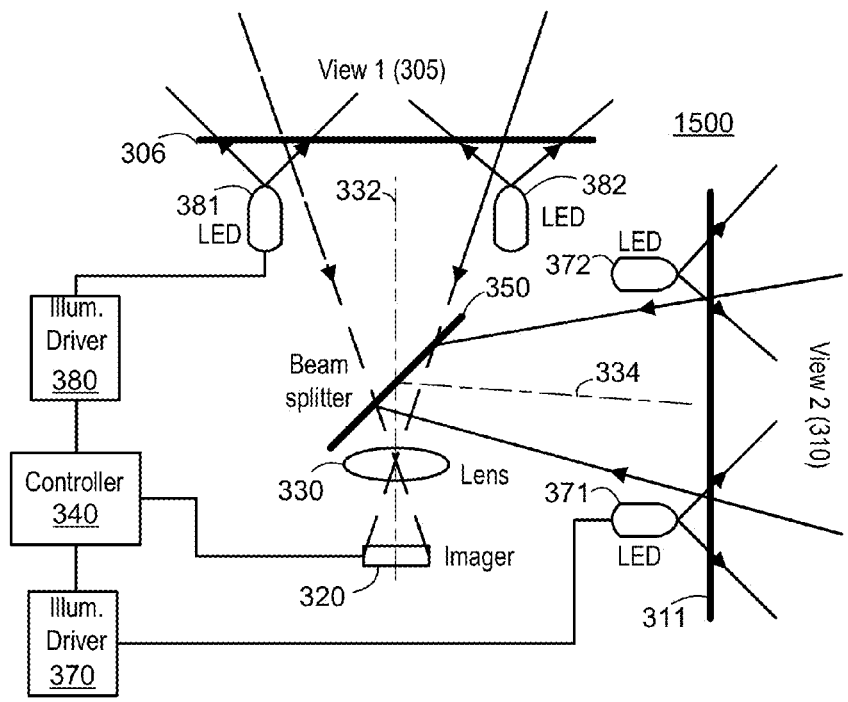
FIG. 15 is a schematic diagram illustrating a top view of a data reader having multiple fields of view, according to another embodiment.

FIG. 15 is a schematic diagram illustrating a top view of a data reader 1500 having fields of view 305 and 310. The data reader 1500 may be identical to the data reader 300 described with reference to FIG. 3, but illustrates a different configuration in which the fields of view 305 and 310 are angled with respect to each other instead of being positioned in a back-to-back configuration. According to one embodiment, the angle between the fields of view 305 and 310 is set between approximately 60 degrees and approximately 120 degrees, and preferably approximately 70 to 90 degrees. Due to the different configuration, the mirror 360 is omitted from the data reader 1500. The components illustrated in FIG. 15 function as described with respect to FIG. 3. Moreover, the data reader 1500 may include any of the components described with reference to FIG. 1, such as the memories 170 and 182, the good read driver 160, and the power supply 190.

Figure 16:
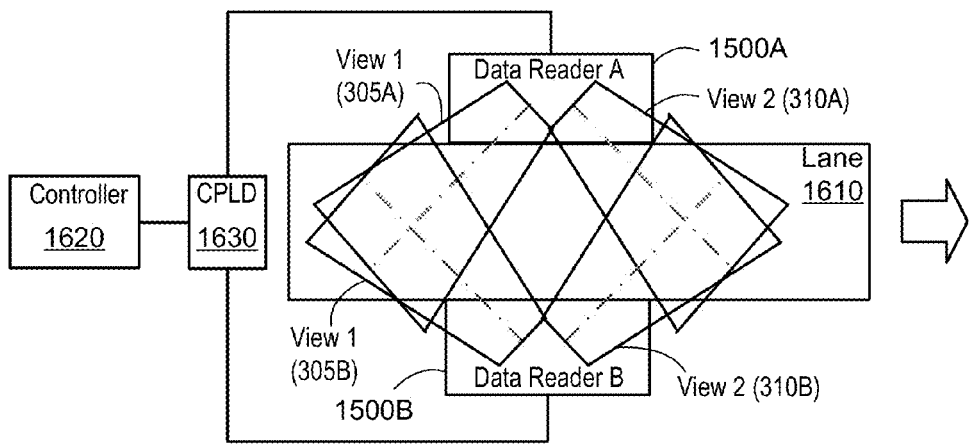
FIGS. 16 and 17 are schematic diagrams illustrating applications of the data reader in FIG. 15, according to various embodiments.

Referring now to FIG. 16, an application of the data reader 1500 in FIG. 15 is illustrated according to one embodiment. In FIG. 16, data readers 1500A and 1500B are used to provide four different views of a lane 1610. One or more additional data readers can be provided to cover the top and bottom views of the lane 1610. The data readers 1500A and 1500B are identical to the data reader 1500 described with reference to FIG. 15, but are positioned on opposing sides of the lane 1610. Thus, in FIG. 16 two imagers 320, two lenses 330, and two beam splitters 350 are used to provide four different views of the lane 1610. The fields of view 305A and 305B are dedicated to reading (e.g., detecting and decoding) optical codes that appear on objects (e.g., merchandise or packages) moving along the lane 1610 toward the data readers 1500A and 1500B. The fields of view 310A and 310B are dedicated to reading optical codes that appear on objects moving along the lane 1610 away from the data readers 1500A and 1500B. The lane 1610 may comprise a self-checkout belt at a point of sale or a conveyor belt at a package sorting facility.

A controller 1620, which may be, for example, a processor, microprocessor, controller, microcontroller, or the like, is in communication with a CPLD 1630 or other programmable logic device, such as an FPGA. The CPLD 1630 is configured to provide signals to the data readers 1500A and 1500B to selectively illuminate and capture images of the fields of view 305A, 310A, 305B, and 310B. The controller 1620 and the CPLD 1630 may be provided in addition to the controller 340 and the illumination drivers 370 and 380 illustrated in FIG. 15, or the controller 1620 and the CPLD 1630 may be provided in place of the controller 340 illustrated in FIG. 15 (e.g., similar to the illumination control circuit 1200 illustrated in FIG. 12). The data readers 1500A and 1500B may implement any of the timing diagrams described with reference to FIGS.

5-9. In particular, with reference to Table 1, below, the fields of view 305A and 305B may be illuminated at the same time or at approximately the same time with the optical pulses selected from group 1. In a similar vein, the fields of view 310A and 310B may be illuminated at the same time or at approximately the same time with the optical pulses selected from group 2. For example, the fields of view 305A and 305B may be illuminated at the same time or at approximately the same time with the optical pulses 520-534 (FIG. 5) and the fields of view 310A and 310B may be illuminated at the same time or at approximately the same time with the optical pulses 540-554, which are offset from the optical pulses 520-534 by the offset 560.

TABLE 1

| | |
|---|---|
| Group 1 | Optical pulses 520-534 (FIG. 5), 620-629 (FIGS. 6 and 7), 820-829 (FIG. 8), and 920-929 (FIG. 9) |
| Group 2 | Optical pulses 540-554 (FIG. 5), 640-649 (FIGS. 6 and 7), 840-849 (FIG. 8), and 940-949 (FIG. 9) |

Figure 17:
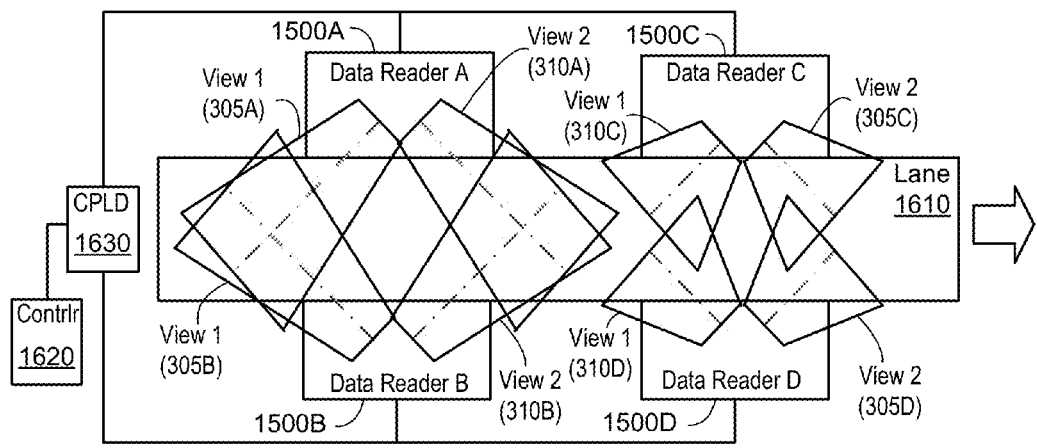

Referring now to FIG. 17, an application of the data reader 1500 in FIG. 15 is illustrated according to another embodiment. The configuration illustrated in FIG. 17 may be identical to the configuration described with reference to FIG. 16, except the configuration illustrated in FIG. 17 also includes data readers 1500C and 1500D. In FIG. 17, the data readers 1500A and 1500B are used to provide four different views of the lane 1610. Similarly, data readers 1500C and 1500D are used to provide four different views of the lane 1610, except the data readers 1500C and 1500D are configured to read (e.g., detect and decode) optical codes in a near field whereas the data readers 1500A and 1500B are configured to read (e.g., detect and decode) optical codes in a far field. In other words, the data readers 1500A and 1500B may include different lenses or have different focus points as compared to the data readers 1500C and 1500D. One or more additional data readers can be provided to provide the top and bottom views of the lane 1610. The data readers 1500A-D may be identical to the data reader 1500 described with reference to FIG. 15, but the data readers 1500A and 1500B are positioned on opposing sides of the lane 1610 and the data readers 1500C and 1500D are positioned on opposing sides of the lane 1610. Thus, in the configuration illustrated in FIG. 17, four imagers 320, four lenses 330, and four beam splitters 350 are used to provide four different views of the lane 1610 in both the near and far field. The fields of view 305A, 305B, 310C, and 310D are dedicated to reading (e.g., detecting and decoding) optical codes that appear on objects (e.g., merchandise or packages) moving along the lane 1610 toward the data readers 1500A-D. The fields of view 310A, 310B, 305C, and 305D are dedicated to reading optical codes that appear on objects moving along the lane 1610 away from the data readers 1500A-D.

The controller 1620, which may be, for example, a processor, microprocessor, controller, microcontroller, or the like, is in communication with the CPLD 1630. The CPLD 1630 is configured to provide signals to the data readers 1500A-D to selectively illuminate and capture images of the fields of view 305A-D and 310A-D. One CPLD 1630 may be configured to control the data readers 1500A-D as illustrated in FIG. 17, or the controller 1620 and the CPLD 1630 may control the data readers 1500A-B and another controller and CPLD may be provided to control the data readers 1500C-D. Moreover, the controller 1620 and the CPLD 1630 may be provided in addition to the controller 340 and the illumination drivers 370 and 380 illustrated in FIG. 15, or the controller 1620 and the CPLD 1630 may be provided in place of the controller 340 illustrated in FIG. 15 (e.g., similar to the illumination control circuit 1200 illustrated in FIG. 12). The data readers 1500A-D may implement any of the timing diagrams described with reference to FIGS. 5-9. In particular, with reference to Table 1, above, the fields of view 305A, 305B, 305C, and 305D may be illuminated at the same time or at approximately the same time with the optical pulses selected from group 1. In a similar vein, the fields of view 310A, 310B, 3100, and 310D may be illuminated at the same time or at approximately the same time with the optical pulses selected from group 2. For example, the fields of view 305A, 305B, 305C, and 305D may be illuminated at the same time or at approximately the same time with the optical pulses 520-534 (FIG. 5) and the fields of view 310A, 310B, 310C, and 310D may be illuminated at the same time or at approximately the same time with the optical pulses 540-554, which are offset from the optical pulses 520-534 by the offset 560.

Referring again to FIG. 1, the view volumes associated with the windows 113 and 115 form a scan volume of the data reader 100. Conceptually, the scan volume includes a portion of space in front the windows 113 and 115 in which optical codes may be read (e.g., detected and decoded) by the data reader 100. Numerous factors affect the overall size and shape of the scan volume, such as the intensity and type of light illuminating the scan volume, the depth of field associated with the data reader (e.g., the distance from the windows 113 and 115 in which an optical code is in sufficient focus to be decoded), and the field of view (at the far focus limit distance of the depth of field) associated with the data reader. For example, the overall size of the scan volume can be increased or decreased by changing the optical output of the illumination sources 120 and 122, such as by increasing or decreasing a pulse width of a driving waveform or by increasing or decreasing an amount of current used to drive the illumination sources 120 and 122.

The scan volume is generally not tightly bound by sharp dividing lines. For example, the sharpness of an object (e.g., an optical code) within the depth of field gradually decreases as the object moves away from an ideal focus point. Further, the field of view generally increases with distance from the focusing optics 330. Thus, conceptually, the scan volume includes a portion of space proximate the data reader in which optical codes may be read (e.g., detected and decoded) by the data reader 100. In other words, the scan volume may be referred to as a volume within which there is a relatively high probability of a successful scan/read. A high level overview of the depth of field and field of view concepts will be described with reference to FIGS. 18 and 19 along with a discussion of how depth of field and field of view interplay to form a scan volume.

Figure 18:
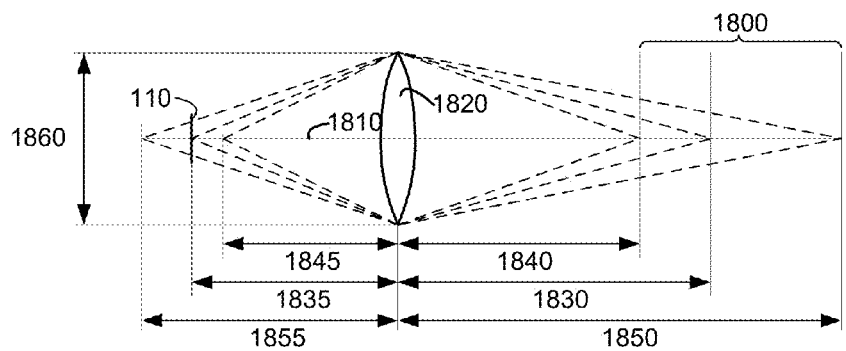
FIG. 18 is a schematic diagram illustrating a depth of field associated with a single lens data reader, according to one embodiment.

FIG. 18 is a schematic diagram illustrating an example depth of field 1800 associated with a single lens data reader. The depth of field 1800 is the distance along an optical axis 1810 of lens 1820 in which an object, such as a package bearing an optical code label, appears to be in focus (or at least in sufficient focus to detect edge transitions of optical codes). An object, such as an optical code, positioned approximately a distance 1830 from the lens 1820 will be in best focus at approximately a distance 1835 from the lens 1820. Thus, the imager 110 may lie in a plane generally parallel to the lens 1820 and be positioned approximately a distance 1835 from the lens 1820. An object located approximately a distance 1840 from the lens 1820 (i.e., the near limit of the depth of field 1800) will be in best focus at approximately a distance 1845 from the lens 1820. However, the object will be in sufficient focus at approximately a distance 1835 from the lens 1820 (i.e., the location of the imager 110) for decoding purposes. Further, an object located approximately a distance 1850 from the lens 1820 (i.e., the far limit of the depth of field 1800) will be in best focus at approximately a distance 1855 from the lens 1820. However, the object will be in sufficiently good focus at approximately a distance 1835 from the lens 1820 (i.e., the location of the imager 110) for decoding purposes. An aperture size or aperture diameter 1860 helps define the depth of field 1800 (i.e., the distance between the near limit and far limit of the depth of field 1800). For example, decreasing the aperture diameter 1860 increases the depth of field 1800, but also reduces the amount of light transmitted through the lens 1820.

A scan volume is bound in one respect by the depth of field associated with each imager, such as the imager 110. The depth of field itself is a function of the distance between the lens and the object, a focal length of the lens, the optical code element size, the aperture diameter of the lens, and the intensity and type of illumination. Thus, with respect to FIG. 1, an optical code on an object positioned between the near and far limits of the depth of field of imager 110 (and facing the windows 113 and 115) would be in sufficient focus to detect edge transitions of optical codes.

Figure 19:
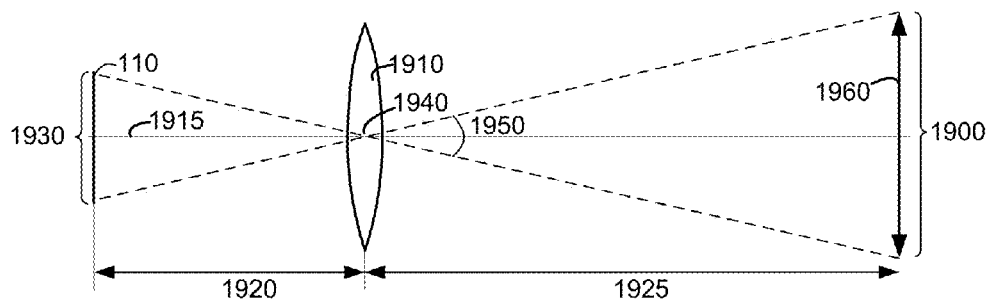
FIG. 19 is a schematic diagram illustrating a field of view associated with a single lens data reader, according to one embodiment.

FIG. 19 is a schematic diagram illustrating an example field of view 1900 associated with a data reader. The field of view is the lateral extent orthogonal to an optical axis of a lens where an object positioned a certain distance from the lens is focused onto an imager of the data reader. The overall dimensions of the imager and the imager's position relative to the lens, the focal length of the lens, and the distance of an object from the lens define the field of view. For example, an imager 110 positioned a distance 1920 away from a lens 1910 and extending a distance 1930 in an orthogonal direction from an optical axis 1915 of the lens 1910 would have a field of view 1900 through a pinhole 1940 of the lens 1910 at a distance 1925 from the lens 1910. Thus, an object 1960 at a distance 1925 from the lens 1910 would occupy the full extent of the imager 110 (e.g., utilize all or substantially all of the pixel imaging elements of the imager 110). Because the dimensions associated with the imager 110 are generally fixed, the field of view of the imager 110 through a pinhole 1940 of the lens 1910 will vary depending on the distance of the object from the lens 1910 (e.g., the field of view becomes smaller at a distance less than distance 1925). Thus, an angle of view 1950 may also be useful in describing an angular extent of an image that the imager 110 can capture through the lens 1910.

Referring again to FIG. 1, the scan volume is bound in another respect by the field of view at the far limit of the depth of field associated with each scanner. Thus, with respect to the imager 110 associated with the windows 113 and 115, an optical code on an object positioned anywhere within an area bound by the field of view at the far limit of the depth of field would be captured by the imager 110 and be in sufficient focus to detect edge transitions thereof. While the depth of field and the field of view (at the far limit of the depth of field) are two factors that affect the overall size of the scan volume, other factors also affect the ability to detect edge transitions of optical codes (and thus the overall size of the scan volume), such as the intensity and type of light illuminating the optical code.

The data readers described herein (e.g., the data readers 100, 300, and 1500) may include a number of user-configurable parameters, such the pulse repetition rate of the optical pulses (e.g., the optical pulses emitted by the illumination sources 120 and 122 or the LEDs 371, 372, 381, and 382), the image capture rate associated with the imager (e.g., the imager 110 or 320), the number of times any one of the steps 405 through 430 (FIG. 4) are repeated, how many fields of view to capture images from (e.g., capturing images from the field of view 112, the field of view 114, or the fields of view 112 and 114 by turning on or off the illumination source 120, the illumination source 122, or the illumination sources 120 and 122), the pulse widths, the frequencies, or the pulse widths and the frequencies of the illumination-driving waveform (e.g., the illumination-driving waveform 1400), and an amount of current used to drive any of the illumination sources. For example, the user may set the illumination settings to optimize the visual effect for the user (e.g., set the illumination source to a relative dim intensity level if the user uses the data reader while sitting). By way of another example, the user may set the illumination settings and image capture rate to maintain a comfortable sweep speed (e.g., how fast an optical code can be swept through the scan volume with a relatively high probability of a successful scan/read). By way of still another example, the user may set the illumination settings and image capture rate to maintain the first pass read rate (e.g., the likelihood that an optical code will be read during the first pass after being presented to the data reader).

The user-configurable parameter(s) are stored, for example, in memory 170, 182, or both (FIG. 1). A user can modify the user-configurable parameter(s) by accessing and changing the stored parameter(s). According to one embodiment, the data reader may be programmed or configured by scanning a configuration optical code. For example, the user-configurable parameters may be read by the data reader from one or more configuration optical codes (e.g., optical codes having user-configurable parameters, instructions, or commands encoded therein). U.S. Pat. Nos. 4,866,257; 4,861,972; and 6,612,495 disclose examples on how a data reader may be configured by scanning a configuration optical code or by downloading information from a host computer.

According to another embodiment, the data reader may be programmed or configured by entering a programming mode (e.g., by navigating to a programming menu of the data reader). For example, a display controller and display device may be configured to display a navigable menu system or graphical user interface (GUI) that allows the user to select and modify (e.g., via a user input device) the user-configurable parameters. The display and user input device can be part of the data reader, or can be associated with an external device such as a personal computer, a personal digital assistant (PDA), or smart phone. If an external device is used, the user-configurable parameters may be communicated from the external device to one or more data readers at some later point. The user-configurable parameters may also be sent from the data reader to an external device, for storage, and possible copying to other data readers. The communication between the data reader and the external device may be wired or wireless, and the data reader may transmit data through any suitable digital communication medium including short distance networks, such as personal area networks, and long distance networks, such as the Internet. In addition, or alternatively, a removable memory, such as flash memory, having one or more user-configurable parameters stored thereon, may be coupled to the data reader so that the data reader may receive the user-configurable parameters without the use of a network interface.

Embodiments may be provided as a computer program product including a nontransitory machine-readable storage medium having stored thereon instructions (in compressed or uncompressed form) that may be used to program a computer (or other electronic device) to perform processes or methods described herein. The nontransitory machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

While embodiments disclosed herein have been discussed in combination with optical codes or barcodes, including 1-D codes (such as UPC and EAN/JAN barcodes), stacked codes (such as PDF417), and 2-D codes (such as Maxicode), it should be understood, however, that the embodiments described herein may be useful for readers used in connection with any type of code or symbol, including fingerprint capture, and nothing herein should be construed as limiting this disclosure to optical codes or any other particular type of code.

As should be appreciated in view of the teachings herein, certain embodiments may be capable of achieving certain advantages, including by way of example and not limitation one or more of the following: (1) providing a system and method for illuminating a scan volume of a data reader; (2) providing a data reader that includes programmable settings; (3) providing a data reader that minimizes the number of imaging chain components when capturing images of multiple fields of view (e.g., back-to-back scanners); (4) providing a data reader that uses the same illumination wavelength without moving parts and generates more than one whole view by time division exposure of an imager and spatial division of the same wavelength illumination; (5) providing a data reader that uses one imager, the same wavelength illumination, and no moving parts to create multiple whole views in a data reader having multiple fields of view; (6) providing a data reader that uses one lens assembly and one imager to capture images of multiple fields of view without splitting the imager view into multiple portions; (7) providing a data reader that uses the same spectrum illumination to capture images of multiple fields of view without wavelength division; (8) providing a data reader that captures images of multiple fields of view without mechanical moving parts; and (9) providing a low cost data reader.

The terms and descriptions used above are set forth by way of illustration only and are not meant as limitations. Skilled persons should understand that many variations can be made to the details of the above-described embodiments without departing from the underlying principles of the invention. The subject matter disclosed in any sentence or paragraph herein can be combined with the subject matter of one or more of any other sentences or paragraphs herein as long as such combinations are not mutually exclusive or inoperable. The scope of the present invention should, therefore, be determined only by the following claims.

The invention claimed is:

1. A method for generating image data using a data reader having an imager with multiple fields of view, the method comprising:
   directing a first field of view of the imager along a first path;
   directing a second field of view of the imager along a second path;
   illuminating, via a first illumination source, the first field of view of the data reader with a first series of illumination pulses at a first pulse repetition rate;
   capturing at the imager a sequence of images at an image capture rate and in an alternating manner with a first set of images of the first field of view and a second set of images of the second field of view and wherein the first pulse repetition rate and the image capture rate are set such that the imager captures the first set of images during the first illumination source illuminating the first field of view with an illumination pulse; and
   in response to receiving a request to capture images of one of the first and second illuminated fields of view, causing the imager to capture images of the one of the first and second illuminated fields of view without capturing images of the other one of the first and second illuminated fields of view.

2. The method of claim 1, further comprising:
   illuminating, via a second illumination source, the second field of view of the data reader with a second series of illumination pulses at a second pulse repetition rate, wherein the second pulse repetition rate and the image capture rate are set such that the imager captures the second set of images during the second illumination source illuminating the second field of view with an illumination pulse.

3. The method of claim 2, wherein the first pulse repetition rate and the second pulse repetition rate are set to approximately 90 hertz and the image capture rate is set to approximately 60 frames per second.

4. The method of claim 2, wherein the first pulse repetition rate and the second pulse repetition rate are set to approximately 1.5 times the image capture rate.

5. The method of claim 2, wherein the first pulse repetition rate and the second pulse repetition rate are set to approximately 60 hertz and the image capture rate is set to approximately 60 frames per second, the method further comprising:
   delaying every other illumination pulse in the first series of illumination pulses such that the imager captures the first set of images at approximately the same time as the first illumination source illuminates the first field of view with an illumination pulse and the first illumination source does not illuminate the first field of view with an illumination pulse when the imager captures the second set of images; and
   delaying every other illumination pulse in the second series of illumination pulses such that the imager captures the second set of images at approximately the same time as the second illumination source illuminates the second field of view with an illumination pulse and the second illumination source does not illuminate the second field of view with an illumination pulse when the imager captures the first set of images.

6. The method of claim 2, wherein the first pulse repetition rate and the second pulse repetition rate are set approximately equal to the image capture rate, the method further comprising:
   delaying every other illumination pulse in the first series of illumination pulses such that the imager captures the first set of images at approximately the same time as the first illumination source illuminates the first field of view with an illumination pulse and the first illumination source does not illuminate the first field of view with an illumination pulse when the imager captures the second set of images; and delaying every other illumination pulse in the second series of illumination pulses such that the imager captures the second set of images at approximately the same time as the second illumination source illuminates the second field of view with an illumination pulse and the second illumination source does not illuminate the second field of view with an illumination pulse when the imager captures the first set of images.

7. The method of claim 2, wherein a wavelength of the first and second illumination sources are approximately equal to each other.

8. The method of claim 1, wherein the imager is configured to capture the first and second set of images over respective first and second exposure durations and the second exposure duration is greater than the first exposure duration.

9. The method of claim 1, further comprising:
processing, via a processor, the sequence of images to detect decodable data corresponding to an optical code.

10. The method of claim 1, wherein light from the second field of view is not prevented from reaching the imager while the imager captures the first set of images.

11. The method of claim 1, wherein the imager captures in the alternating manner the first and second sets of images independent of any mechanical moving parts.

12. The method of claim 1, wherein the imager includes a set of pixel imaging elements and wherein the first and second fields of view are directed toward the imager such that the first and second fields of view are focused onto substantially all of the set of pixel imaging elements of the imager.

13. The method of claim 1, wherein the first and second fields of view are directed toward a common portion of the imager.

14. The method of claim 1, wherein the first and second fields of view are not directed toward different portions of the imager.

15. The method of claim 1, wherein the first set of images comprises a single image and the second set of images comprises two or more images.

16. The method of claim 1, further comprising:
in response to receiving a request to adjust the first pulse repetition rate from a first value to a second value that is different from the first value, adjusting the first pulse repetition rate to the second value.

17. The method of claim 1, further comprising:
in response to receiving a request to adjust the image capture rate from a first value to a second value that is different from the first value, adjusting the image capture rate to the second value.

18. The method of claim 1, wherein at least a portion of the first and second fields of view do not overlap.

19. The method of claim 1, wherein the first and second fields of view do not overlap.

20. A method for generating image data using a data reader having an imager with multiple fields of view, the method comprising:
directing a first field of view of the imager along a first path;
directing a second field of view of the imager along a second path;
illuminating, via a first illumination source, the first field of view of the data reader with a first series of illumination pulses at a first pulse repetition rate;
capturing at the imager a sequence of images at an image capture rate and in an alternating manner with a first set of images of the first field of view and a second set of images of the second field of view and wherein the first pulse repetition rate and the image capture rate are set such that the imager captures the first set of images during the first illumination source illuminating the first field of view with an illumination pulse, wherein one of the first or second fields of view corresponds to a checker side of the data reader and the other one of the first or second fields of view corresponds to a customer side of the data reader.

21. A data reader, comprising:
a first illumination source configured to illuminate a first field of view of the data reader with a first series of illumination pulses at a first pulse repetition rate;
an imager including a set of pixel imaging elements arranged in a two-dimensional imaging plane;
a lens in optical association with the imager and configured to focus one or more fields of view onto substantially all of the pixel imaging elements of the imager;
a beam splitter in optical association with the lens and the imager, wherein the beam splitter is configured to direct light from the first field of view of the data reader along a first path to the lens and the imager and to direct light from a second field of view of the data reader along a second path to the lens and the imager; and
a controller configured to be in operative association with the first illumination source and the imager, the controller configured to cause the imager to capture a sequence of images at an image capture rate, wherein the imager captures in an alternating manner a first set of images of the first field of view and a second set of images of the second field of view and wherein the first pulse repetition rate and the image capture rate are set such that the imager captures the first set of images at approximately the same time as the first illumination source illuminates the first field of view with an illumination pulse.

22. The data reader of claim 21, further comprising:
a second illumination source configured to illuminate the second field of view of the data reader with a second series of illumination pulses at a second pulse repetition rate, wherein the second pulse repetition rate and the image capture rate are set such that the imager captures the second set of images at approximately the same time as the second illumination source illuminates the second field of view with an illumination pulse.

23. The data reader of claim 21, further comprising:
one or more fixed mirrors in optical association with the beam splitter, the lens, and the imager, wherein the one or more fixed mirrors are configured to redirect the second field of view toward the beam splitter.

24. The data reader of claim 21, wherein at least a portion of the first and second fields of view do not overlap.

25. The data reader of claim 21, wherein the first and second fields of view do not overlap.

* * * * *

UNITED STATES PATENT AND TRADEMARK OFFICE
CERTIFICATE OF CORRECTION

PATENT NO. : 9,141,842 B2  Page 1 of 1
APPLICATION NO. : 13/767652
DATED : September 22, 2015
INVENTOR(S) : WenLiang Gao It is certified that error appears in the above-identified patent and that said Letters Patent is hereby corrected as shown below:

In the Specification

In column 4, line 8, please replace "based light" with --based on light--.

In column 6, line 3, please replace "also self-checkout" with --also a self-checkout--.

In column 6, line 41, please replace "an narrow bandpass" with --a narrow bandpass--.

In column 6, line 48, please replace "images the field" with --images of the field--.

In column 7, line 33, please replace "in front the windows" with --in front of the windows--.

In column 15, line 5, please replace "images the field" with --images of the field--.

In column 17, line 3, please replace "at same time" with --at the same time--.

In column 26, line 30, please replace "sequence of images are" with --sequence of images is--.

In column 26, line 42, please replace "third image capture of" with --third image captured of--.

In column 27, line 6, after "FIGS 5-9", add a ".".

In column 30, line 9, please replace "3100" with --310C--.

In column 30, line 22, please replace "space in front the windows" with --space in front of the windows--.

In column 31, line 63, please replace "such the pulse repetition" with --such as the pulse repetition--.

Signed and Sealed this
Twenty-eighth Day of June, 2016

Michelle K. Lee
*Director of the United States Patent and Trademark Office*